US009614934B2

(12) United States Patent
Levy et al.

(10) Patent No.: US 9,614,934 B2
(45) Date of Patent: *Apr. 4, 2017

(54) METHODS AND SYSTEMS FOR HARVESTING COMMENTS REGARDING USERS ON A NETWORK-BASED FACILITY

(71) Applicant: PayPal, Inc., San Jose, CA (US)

(72) Inventors: Daniele Levy, San Francisco, CA (US); Steve Grove, San Jose, CA (US); Dheeraj Singh Mohnia, Palo Alto, CA (US); Alex Dai-Shun Poon, Los Altos Hills, CA (US)

(73) Assignee: PAYPAL, INC., San Jose, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/086,805

(22) Filed: Nov. 21, 2013

(65) Prior Publication Data

US 2014/0082063 A1 Mar. 20, 2014

Related U.S. Application Data

(63) Continuation of application No. 12/202,145, filed on Aug. 29, 2008, now Pat. No. 8,612,297, which is a
(Continued)

(51) Int. Cl.
*G06F 15/16* (2006.01)
*H04L 29/06* (2006.01)
(Continued)

(52) U.S. Cl.
CPC ....... *H04L 67/42* (2013.01); *G06Q 10/06395*
(2013.01); *G06Q 20/10* (2013.01);
(Continued)

(58) Field of Classification Search
CPC ........... H04L 2209/60; H04L 21/44222; H04L 21/44213; G06Q 30/02; G06Q 30/0282; G06Q 30/06; G06Q 30/0601
(Continued)

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

CA 2253543 A1 3/1997
FR 2658635 A1 8/1991
(Continued)

OTHER PUBLICATIONS

"@Home Network Names buydirect.com as Its Online Software Retailer", PR Newswire; New York, (Nov. 16, 1998), 3 pages.
(Continued)

*Primary Examiner* — Wing F Chan
*Assistant Examiner* — Andrew Woo
(74) *Attorney, Agent, or Firm* — Maschoff Brennan

(57) ABSTRACT

Systems and methods for harvesting comments regarding users on a network-based facility are described. The method involves presenting a single input interface via a communications network that includes input mechanisms. The input mechanisms include a first input mechanism facilitating user input of comment information that pertains to a first user and a second input mechanism facilitating user input of comment information that pertains to a second user. The method further involves receiving the comment information via the communications network. The comment information is provided through the single input interface and pertains to the first user and the second user.

16 Claims, 15 Drawing Sheets

Related U.S. Application Data continuation of application No. 11/758,196, filed on Jun. 5, 2007, now Pat. No. 7,587,359, which is a continuation of application No. 09/515,575, filed on Feb. 29, 2000, now Pat. No. 7,428,505.

(51) Int. Cl.

| | | |
|---|---|---|
| *G06Q 20/10* | (2012.01) | |
| *G06Q 30/02* | (2012.01) | |
| *G06Q 30/06* | (2012.01) | |
| *G06Q 40/00* | (2012.01) | |
| *G06Q 40/04* | (2012.01) | |
| *G06Q 40/06* | (2012.01) | |
| *G06Q 40/02* | (2012.01) | |
| *G06Q 10/06* | (2012.01) | |

(52) U.S. Cl.
CPC ........... *G06Q 20/102* (2013.01); *G06Q 30/02* (2013.01); *G06Q 30/0203* (2013.01); *G06Q 30/0282* (2013.01); *G06Q 30/0601* (2013.01); *G06Q 40/00* (2013.01); *G06Q 40/025* (2013.01); *G06Q 40/04* (2013.01); *G06Q 40/06* (2013.01); *G06Q 40/10* (2013.01)

(58) Field of Classification Search
USPC .................................................. 709/201, 203
See application file for complete search history.

(56) References Cited

U.S. PATENT DOCUMENTS

| | | |
|---|---|---|
| 4,412,287 A | 10/1983 | Braddock, III |
| 4,486,853 A | 12/1984 | Parsons |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,285,496 A | 2/1994 | Frank et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,416,903 A | 5/1995 | Malcolm |
| 5,426,281 A | 6/1995 | Abecassis |
| 5,485,510 A | 1/1996 | Colbert |
| 5,537,618 A | 7/1996 | Boulton et al. |
| 5,553,145 A | 9/1996 | Micali |
| 5,557,728 A | 9/1996 | Garrett et al. |
| 5,566,291 A | 10/1996 | Boulton et al. |
| 5,583,763 A | 12/1996 | Atcheson et al. |
| 5,592,375 A | 1/1997 | Salmon et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,659,366 A | 8/1997 | Kerman |
| 5,664,115 A | 9/1997 | Fraser |
| 5,669,877 A | 9/1997 | Blomquist |
| 5,678,041 A | 10/1997 | Baker et al. |
| 5,689,652 A | 11/1997 | Lupien et al. |
| 5,694,546 A | 12/1997 | Reisman |
| 5,703,624 A | 12/1997 | van Kruistum |
| 5,706,457 A | 1/1998 | Dwyer et al. |
| 5,706,493 A | 1/1998 | Sheppard, II |
| 5,706,507 A | 1/1998 | Schloss |
| 5,708,829 A | 1/1998 | Kadashevich et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,732,954 A | 3/1998 | Strickler et al. |
| 5,737,479 A | 4/1998 | Fujinami |
| 5,754,939 A | 5/1998 | Herz et al. |
| 5,760,917 A | 6/1998 | Sheridan |
| 5,761,655 A | 6/1998 | Hoffman |
| 5,771,291 A | 6/1998 | Newton et al. |
| 5,771,380 A | 6/1998 | Tanaka et al. |
| 5,774,121 A | 6/1998 | Stiegler |
| 5,778,135 A | 7/1998 | Ottesen et al. |
| 5,781,246 A | 7/1998 | Alten et al. |
| 5,787,253 A | 7/1998 | McCreery et al. |
| 5,790,426 A | 8/1998 | Robinson |
| 5,790,790 A | 8/1998 | Smith et al. |
| 5,793,027 A | 8/1998 | Baik |
| 5,794,219 A | 8/1998 | Brown |
| 5,794,237 A | 8/1998 | Gore, Jr. |
| 5,799,285 A | 8/1998 | Klingman |
| 5,799,304 A | 8/1998 | Miller |
| 5,803,500 A | 9/1998 | Mossberg |
| 5,809,482 A | 9/1998 | Strisower |
| 5,810,771 A | 9/1998 | Blomquist |
| 5,818,914 A | 10/1998 | Fujisaki |
| 5,822,123 A | 10/1998 | Davis et al. |
| 5,826,244 A | 10/1998 | Huberman |
| 5,828,419 A | 10/1998 | Bruette et al. |
| 5,830,068 A | 11/1998 | Brenner et al. |
| 5,832,472 A | 11/1998 | Sheppard, II |
| 5,835,896 A | 11/1998 | Fisher et al. |
| 5,845,265 A | 12/1998 | Woolston |
| 5,845,266 A | 12/1998 | Lupien et al. |
| 5,848,396 A | 12/1998 | Gerace |
| 5,850,442 A | 12/1998 | Muftic |
| 5,862,230 A | 1/1999 | Darby |
| 5,867,799 A | 2/1999 | Lang et al. |
| 5,870,744 A | 2/1999 | Sprague |
| 5,872,848 A | 2/1999 | Romney et al. |
| 5,872,850 A | 2/1999 | Klein et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,944,790 A | 8/1999 | Levy |
| 5,950,172 A | 9/1999 | Klingman |
| 5,970,469 A | 10/1999 | Scroggie et al. |
| 5,974,412 A | 10/1999 | Hazlehurst et al. |
| 5,991,739 A | 11/1999 | Cupps et al. |
| 6,029,141 A | 2/2000 | Bezos et al. |
| 6,035,402 A | 3/2000 | Vaeth et al. |
| 6,044,363 A | 3/2000 | Mori et al. |
| 6,047,264 A | 4/2000 | Fisher et al. |
| 6,052,723 A | 4/2000 | Ginn |
| 6,055,518 A | 4/2000 | Franklin et al. |
| 6,058,417 A | 5/2000 | Hess et al. |
| 6,061,448 A | 5/2000 | Smith et al. |
| 6,064,980 A | 5/2000 | Jacobi et al. |
| 6,066,075 A | 5/2000 | Poulton |
| 6,070,145 A | 5/2000 | Pinsley et al. |
| 6,073,117 A | 6/2000 | Oyanagi et al. |
| 6,073,138 A | 6/2000 | de l'Etraz et al. |
| 6,085,176 A | 7/2000 | Woolston |
| 6,092,049 A | 7/2000 | Chislenko et al. |
| 6,101,489 A | 8/2000 | Lannert et al. |

(56) References Cited

U.S. PATENT DOCUMENTS

| | | | |
|---|---|---|---|
| 6,104,815 A | 8/2000 | Alcorn et al. |
| 6,112,186 A | 8/2000 | Bergh et al. |
| 6,119,078 A | 9/2000 | Kobayakawa et al. |
| 6,119,137 A | 9/2000 | Smith et al. |
| 6,122,666 A | 9/2000 | Beurket et al. |
| 6,134,548 A | 10/2000 | Gottsman et al. |
| 6,141,653 A | 10/2000 | Conklin et al. |
| 6,148,299 A | 11/2000 | Yoshimoto |
| 6,161,099 A | 12/2000 | Harrington et al. |
| 6,178,408 B1 | 1/2001 | Copple et al. |
| 6,189,029 B1 | 2/2001 | Fuerst |
| 6,192,407 B1 | 2/2001 | Smith et al. |
| 6,199,049 B1 | 3/2001 | Conde et al. |
| 6,202,051 B1 | 3/2001 | Woolston |
| 6,216,539 B1 | 4/2001 | Johnson et al. |
| 6,236,975 B1 | 5/2001 | Boe et al. |
| 6,236,977 B1 | 5/2001 | Verba et al. |
| 6,237,059 B1 | 5/2001 | Dean et al. |
| 6,243,691 B1 | 6/2001 | Fisher et al. |
| 6,266,649 B1 | 7/2001 | Linden et al. |
| 6,275,811 B1 | 8/2001 | Ginn |
| 6,292,769 B1 | 9/2001 | Flanagan et al. |
| 6,311,190 B1 | 10/2001 | Bayer et al. |
| 6,313,833 B1 | 11/2001 | Knight |
| 6,321,221 B1 | 11/2001 | Bieganski |
| 6,327,574 B1 | 12/2001 | Kramer et al. |
| 6,352,479 B1 | 3/2002 | Sparks, II |
| 6,374,290 B1 | 4/2002 | Scharber et al. |
| 6,396,472 B1 | 5/2002 | Jacklin |
| 6,405,159 B2 | 6/2002 | Bushey et al. |
| 6,405,175 B1* | 6/2002 | Ng .................. G06Q 30/02 |
| | | | 705/14.26 |
| 6,415,270 B1 | 7/2002 | Rackson et al. |
| 6,466,917 B1 | 10/2002 | Goyal et al. |
| 6,466,918 B1 | 10/2002 | Spiegel et al. |
| 6,477,509 B1 | 11/2002 | Hammons et al. |
| 6,484,153 B1 | 11/2002 | Walker et al. |
| 6,493,703 B1 | 12/2002 | Knight et al. |
| 6,505,201 B1 | 1/2003 | Haitsuka et al. |
| 6,523,037 B1 | 2/2003 | Monahan et al. |
| 6,539,392 B1 | 3/2003 | Rebane |
| 6,601,759 B2 | 8/2003 | Fife et al. |
| 6,606,581 B1 | 8/2003 | Crofoot et al. |
| 6,615,258 B1 | 9/2003 | Barry et al. |
| 6,697,824 B1 | 2/2004 | Bowman-Amuah |
| 6,856,963 B1 | 2/2005 | Hurwitz |
| 6,859,783 B2 | 2/2005 | Cogger et al. |
| 6,952,678 B2 | 10/2005 | Williams et al. |
| 6,963,848 B1 | 11/2005 | Brinkerhoff |
| 7,024,383 B1 | 4/2006 | Mancini et al. |
| 7,031,952 B1 | 4/2006 | Heumann et al. |
| 7,065,494 B1 | 6/2006 | Evans |
| 7,096,193 B1 | 8/2006 | Beaudoin et al. |
| 7,177,836 B1 | 2/2007 | German et al. |
| 7,428,505 B1 | 9/2008 | Levy et al. |
| 7,433,832 B1 | 10/2008 | Bezos et al. |
| 7,587,359 B2 | 9/2009 | Levy et al. |
| 7,778,890 B1 | 8/2010 | Bezos et al. |
| 8,290,809 B1* | 10/2012 | Ratterman ............. G06Q 10/10 |
| | | | 705/319 |
| 8,612,297 B2 | 12/2013 | Levy et al. |
| 8,635,098 B2 | 1/2014 | Ratterman et al. |
| 9,015,585 B2 | 4/2015 | Boone |
| 2001/0029455 A1 | 10/2001 | Chin et al. |
| 2001/0037206 A1 | 11/2001 | Falk et al. |
| 2001/0037253 A1 | 11/2001 | Kensey |
| 2001/0047290 A1 | 11/2001 | Petras et al. |
| 2002/0007338 A1 | 1/2002 | Do |
| 2002/0069200 A1 | 6/2002 | Cooper et al. |
| 2002/0082989 A1 | 6/2002 | Fife et al. |
| 2002/0095305 A1 | 7/2002 | Gakidis et al. |
| 2002/0118225 A1 | 8/2002 | Miksovsky |
| 2002/0138402 A1 | 9/2002 | Zacharia et al. |
| 2003/0014318 A1 | 1/2003 | De La Motte et al. |
| 2003/0131232 A1 | 7/2003 | Fraser et al. |
| 2003/0167209 A1 | 9/2003 | Hsieh |
| 2004/0128155 A1 | 7/2004 | Vaidyanathan et al. |
| 2004/0169678 A1 | 9/2004 | Oliver |
| 2004/0210550 A1 | 10/2004 | Williams et al. |
| 2004/0225577 A1 | 11/2004 | Robinson |
| 2004/0243527 A1 | 12/2004 | Gross |
| 2004/0243604 A1 | 12/2004 | Gross |
| 2004/0267604 A1 | 12/2004 | Gross |
| 2005/0125826 A1 | 6/2005 | Hunleth et al. |
| 2005/0182660 A1 | 8/2005 | Henley |
| 2007/0208454 A1 | 9/2007 | Forrester et al. |
| 2008/0065994 A1 | 3/2008 | Wang et al. |
| 2011/0231530 A1 | 9/2011 | Veres et al. |
| 2012/0054070 A1 | 3/2012 | Flubr et al. |
| 2012/0089410 A1 | 4/2012 | Mikurak |
| 2013/0041717 A1 | 2/2013 | Ratterman et al. |
| 2013/0111364 A1 | 5/2013 | Boone et al. |
| 2014/0136367 A1 | 5/2014 | Ratterman et al. |
| 2014/0249956 A1 | 9/2014 | Ratterman et al. |
| 2014/0258033 A1 | 9/2014 | Ratterman et al. |
| 2014/0258034 A1 | 9/2014 | Ratterman et al. |
| 2014/0258035 A1 | 9/2014 | Ratterman et al. |
| 2014/0258036 A1 | 9/2014 | Ratterman et al. |
| 2014/0258171 A1 | 9/2014 | Ratterman et al. |
| 2015/0227990 A1 | 8/2015 | Boone et al. |

FOREIGN PATENT DOCUMENTS

| | | |
|---|---|---|
| JP | 2005010978 A | 1/2005 |
| NL | 9300266 A | 9/1994 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |
| WO | WO-0165338 A3 | 9/2001 |
| WO | WO-03010621 A2 | 2/2003 |
| WO | WO-03010621 A3 | 2/2003 |

OTHER PUBLICATIONS

"U.S. Appl. No. 09/412,893, Advisory Action mailed May 19, 2003", 3 pgs.

"U.S. Appl. No. 09/412,893, Advisory Action mailed Jun. 19, 2006", 3 pgs.

"U.S. Appl. No. 09/412,893, Advisory Action mailed Oct. 11, 2005", 3 pgs.

"U.S. Appl. No. 09/412,893, Appeal Brief filed Aug. 2, 2006", 26 pgs.

"U.S. Appl. No. 09/412,893, Final Office Action mailed Jan. 6, 2003", 8 pgs.

"U.S. Appl. No. 09/412,893, Final Office Action mailed Feb. 17, 2004", 16 pgs.

"U.S. Appl. No. 09/412,893, Final Office Action mailed Mar. 27, 2005", 32 pgs.

"U.S. Appl. No. 09/412,893, Final Office Action mailed Jul. 26, 2005", 22 pgs.

"U.S. Appl. No. 09/412,893, Final Office Action mailed Nov. 30, 2004", 14 pgs.

"U.S. Appl. No. 09/412,893, Non Final Office Action mailed Mar. 7, 2005", 15 pgs.

"U.S. Appl. No. 09/412,893, Non Final Office Action mailed Jul. 22, 2004", 14 pgs.

"U.S. Appl. No. 09/412,893, Non Final Office Action mailed Sep. 9, 2002", 7 pgs.

"U.S. Appl. No. 09/412,893, Non Final Office Action mailed Oct. 21, 2003", 14 pgs.

"U.S. Appl. No. 09/412,893, Non Final Office Action mailed Nov. 22, 2005", 20 pgs.

"U.S. Appl. No. 09/412,893, Non-Final Office Action mailed Jul. 20, 2009", 2 pgs.

"U.S. Appl. No. 09/412,893, Preliminary Amendment filed Sep. 8, 2003", 23 pgs.

"U.S. Appl. No. 09/412,893, Preliminary Amendment filed Oct. 5, 1999", 1 pg.

(56) References Cited

OTHER PUBLICATIONS

"U.S. Appl. No. 09/412,893, Response filed Jan. 22, 2004 to Non Final Office Action mailed Oct. 21, 2003", 26 pgs.
"U.S. Appl. No. 09/412,893, Response filed Feb. 21, 2006 to Non Final Office Action mailed Nov. 22, 2005", 16 pgs.
"U.S. Appl. No. 09/412,893, Response filed May 6, 2003 to Final Office Action mailed Jan. 6, 2003", 4 pgs.
"U.S. Appl. No. 09/412,893, Response filed May 30, 2006 to Final Office Action mailed Mar. 27, 2006", 6 pgs.
"U.S. Appl. No. 09/412,893, Response filed Jun. 4, 2004 to Final Office Action mailed Feb. 17, 2004", 15 pgs.
"U.S. Appl. No. 09/412,893, Response filed Jun. 7, 2005 to Non-Final Office Action mailed Mar. 7, 2005", 13 pgs.
"U.S. Appl. No. 09/412,893, Response filed Sep. 24, 2005 to Final Office Action mailed Jul. 26, 2005", 15 pgs.
"U.S. Appl. No. 09/412,893, Response filed Sep. 29, 2004 to Non-Final Office Action mailed Jul. 22, 2004", 15 pgs.
"U.S. Appl. No. 09/412,893, Response filed Dec. 9, 2002 to Non Final Office Action mailed Sep. 9, 2002", 6 pgs.
"U.S. Appl. No. 09/412,893, Supplemental Preliminary Amendment filed May 3, 2000", 7 pgs.
"U.S. Appl. No. 09/503,960, Advisory Action mailed Jul. 18, 2003", 5 pgs.
"U.S. Appl. No. 09/503,960, Advisory Action mailed Jul. 30, 2004", 4 pgs.
"U.S. Appl. No. 09/503,960, Appeal Brief filed Jan. 16, 2007", 30 pgs.
"U.S. Appl. No. 09/503,960, Appeal Brief filed May 23, 2007", 33 pgs.
"U.S. Appl. No. 09/503,960, Appeal Brief filed Jul. 12, 2007", 6 pgs.
"U.S. Appl. No. 09/503,960, Final Office Action mailed Apr. 13, 2006", 20 pgs.
"U.S. Appl. No. 09/503,960, Final Office Action mailed Apr. 22, 2003", 19 pgs.
"U.S. Appl. No. 09/503,960, Final Office Action mailed Apr. 27, 2004", 21 pgs.
"U.S. Appl. No. 09/503,960, Final Office Action mailed Mar. 22, 2011", 21 pgs.
"U.S. Appl. No. 09/503,960, Non Final Office Action mailed May 22, 2002", 19 pgs.
"U.S. Appl. No. 09/503,960, Non Final Office Action mailed Sep. 13, 2005", 21 pgs.
"U.S. Appl. No. 09/503,960, Non Final Office Action mailed Sep. 28, 2011", 29 pgs.
"U.S. Appl. No. 09/503,960, Non Final Office Action mailed Nov. 19, 2003", 20 pgs.
"U.S. Appl. No. 09/503,960, Non Final Office Action mailed Nov. 20, 2002", 16 pgs.
"U.S. Appl. No. 09/503,960, Non Final Office Action mailed Dec. 22, 2004", 18 pgs.
"U.S. Appl. No. 09/503,960, Non-Final Office Action mailed Jul. 14, 2010", 21 pgs.
"U.S. Appl. No. 09/503,960, Notice of Allowance mailed Feb. 29, 2012", 22 pgs.
"U.S. Appl. No. 09/503,960, Notice of Allowance mailed Jun. 15, 2012", 10 pgs.
"U.S. Appl. No. 09/503,960, Pre-Appeal Brief Request filed Aug. 14, 2006", 4 pgs.
"U.S. Appl. No. 09/503,960, Preliminary Amendment filed Aug. 20, 2003", 13 pgs.
"U.S. Appl. No. 09/503,960, Reply Brief filed Dec. 11, 2007", 7 pgs.
"U.S. Appl. No. 09/503,960, Response filed Jan. 13, 2006 to Non Final Office Action mailed Sep. 13, 2005", 18 pgs.
"U.S. Appl. No. 09/503,960, Response filed Jan. 30, 2012 to Non Final Office Action mailed Sep. 28, 2011", 18 pgs.
"U.S. Appl. No. 09/503,960, Response filed Feb. 19, 2004 to Final Office Action mailed Nov. 19, 2003", 14 pgs.
"U.S. Appl. No. 09/503,960, Response filed Feb. 20, 2003 to Non Final Office Action mailed Nov. 20, 2002", 11 pgs.
"U.S. Appl. No. 09/503,960, Response filed May 23, 2011 to Final Office Action mailed Mar. 22, 2011", 16 pgs.
"U.S. Appl. No. 09/503,960, Response filed Jun. 15, 2005 to Non Final Office Action mailed Dec. 22, 2004", 17 pgs.
"U.S. Appl. No. 09/503,960, Response filed Jun. 23, 2003 to Final Office Action mailed Apr. 22, 2003", 9 pgs.
"U.S. Appl. No. 09/503,960, Response filed Jun. 25, 2004 to Final Office Action mailed Apr. 27, 2004", 13 pgs.
"U.S. Appl. No. 09/503,960, Response filed Aug. 19, 2002 to Non Final Office Action mailed May 22, 2002", 12 pgs.
"U.S. Appl. No. 09/503,960, Response filed Oct. 14, 2010 to Non Final Office Action mailed Jul. 14, 2010", 18 pgs.
"U.S. Appl. No. 09/515,575, 312 Amendment filed Jun. 4, 2007", 12 pgs.
"U.S. Appl. No. 09/515,575, Advisory Action mailed Mar. 22, 2004", 2 pgs.
"U.S. Appl. No. 09/515,575, Advisory Action mailed Dec. 12, 2006", 3 pgs.
"U.S. Appl. No. 09/515,575, Examiner Interview Summary and Supplemental Amendment filed Oct. 4, 2007", 10 pgs.
"U.S. Appl. No. 09/515,575, Examiner Interview Summary mailed Apr. 17, 2003", 2 pgs.
"U.S. Appl. No. 09/515,575, Examiner Interview Summary mailed Aug. 13, 2002", 12 pgs.
"U.S. Appl. No. 09/515,575, Examiner Interview Summary mailed Sep. 6, 2007", 3 pgs.
"U.S. Appl. No. 09/515,575, Final Office Action mailed May 22, 2002", 18 pgs.
"U.S. Appl. No. 09/515,575, Final Office Action mailed Sep. 22, 2006", 17 pgs.
"U.S. Appl. No. 09/515,575, Final Office Action mailed Dec. 17, 2003", 15 pgs.
"U.S. Appl. No. 09/515,575, Non Final Office Action mailed Mar. 21, 2006", 17 pgs.
"U.S. Appl. No. 09/515,575, Non Final Office Action mailed Jul. 13, 2004", 6 pgs.
"U.S. Appl. No. 09/515,575, Non Final Office Action mailed Jul. 18, 2001", 15 pgs.
"U.S. Appl. No. 09/515,575, Non Final Office Action mailed Sep. 14, 2005", 17 pgs.
"U.S. Appl. No. 09/515,575, Non Final Office Action mailed Dec. 19, 2002", 19 pgs.
"U.S. Appl. No. 09/515,575, Notice of Allowance mailed Mar. 8, 2007", 10 pgs.
"U.S. Appl. No. 09/515,575, Notice of Allowance mailed Apr. 23, 2008", 6 pgs.
"U.S. Appl. No. 09/515,575, Notice of Allowance mailed Aug. 6, 2008", 10 pgs.
"U.S. Appl. No. 09/515,575, Response filed Jan. 17, 2006 to Non Final Office Action mailed Sep. 14, 2005", 11 pgs.
"U.S. Appl. No. 09/515,575, Response filed Feb. 27, 2004 to Final Office Action mailed Dec. 17, 2003", 12 pgs.
"U.S. Appl. No. 09/515,575, Response filed Apr. 21, 2003 to Non Final Office Action mailed Dec. 19, 2002", 10 pgs.
"U.S. Appl. No. 09/515,575, Response filed Jun. 21, 2006 to Non Final Office Action mailed Mar. 21, 2006", 6 pgs.
"U.S. Appl. No. 09/515,575, Response filed Sep. 16, 2002 to Final Office Action mailed May 22, 2002", 15 pgs.
"U.S. Appl. No. 09/515,575, Response filed Oct. 13, 2004 to Non Final Office Action mailed Jul. 13, 2004", 14 pgs.
"U.S. Appl. No. 09/515,575, Response filed Oct. 18, 2001 to Non Final Office Action mailed Jul. 18, 2001", 23 pgs.
"U.S. Appl. No. 09/515,575, Response filed Nov. 7, 2006 to Final Office Action mailed Sep. 22, 2006", 13 pgs.
"U.S. Appl. No. 09/740,502, Notice of Non-Responsive Amendment mailed Dec. 7, 2012", 6 pgs.
"U.S. Appl. No. 09/740,502, Advisory Action mailed Feb. 24, 2006", 4 pgs.
"U.S. Appl. No. 09/740,502, Advisory Action mailed Jul. 19, 2007", 4 pgs.
"U.S. Appl. No. 09/740,502, Examiner Interview Summary mailed Mar. 17, 2008", 2 pgs.

(56) References Cited

OTHER PUBLICATIONS

"U.S. Appl. No. 09/740,502, Final Office Action mailed Jan. 4, 2010", 16 pgs.
"U.S. Appl. No. 09/740,502, Final Office Action mailed Jan. 14, 2009", 14 pgs.
"U.S. Appl. No. 09/740,502, Final Office Action mailed Jan. 27, 2006", 23 pgs.
"U.S. Appl. No. 09/740,502, Final Office Action mailed Mar. 2, 2005", 23 pgs.
"U.S. Appl. No. 09/740,502, Final Office Action mailed Apr. 19, 2007", 12 pgs.
"U.S. Appl. No. 09/740,502, Non Final Office Action mailed Aug. 8, 2005", 23 pgs.
"U.S. Appl. No. 09/740,502, Non Final Office Action mailed Sep. 16, 2004", 21 pgs.
"U.S. Appl. No. 09/740,502, Non Final Office Action mailed Oct. 19, 2006", 12 pgs.
"U.S. Appl. No. 09/740,502, Non-Final Office Action mailed Jan. 4, 2008", 12 pgs.
"U.S. Appl. No. 09/740,502, Non-Final Office Action mailed Jun. 10, 2009", 15 pgs.
"U.S. Appl. No. 09/740,502, Non-Final Office Action mailed Jul. 31, 2008", 13 pgs.
"U.S. Appl. No. 09/740,502, Preliminary Amendment filed Apr. 28, 2003", 14 pgs.
"U.S. Appl. No. 09/740,502, Preliminary Amendment mailed Dec. 2, 2003", 20 pgs.
"U.S. Appl. No. 09/740,502, Response filed Jan. 23, 2007 to Non-Final Office Action mailed Oct. 19, 2006", 11 pgs.
"U.S. Appl. No. 09/740,502, Response filed Mar. 4, 2010 to Final Office Action mailed Jan. 4, 2010", 13 pgs.
"U.S. Appl. No. 09/740,502, Response filed Mar. 16, 2009 to Final Office Action mailed Jan. 14, 2009", 12 pgs.
"U.S. Appl. No. 09/740,502, Response filed Mar. 24, 2008 to Non-Final Office Action mailed Jan. 4, 2008 ", 9 pgs.
"U.S. Appl. No. 09/740,502, Response filed Mar. 27, 2006 to Final Office Action mailed Jan. 27, 2006", 24 pgs.
"U.S. Appl. No. 09/740,502, Response filed May 2, 2005 to Final Office Action mailed Mar. 2, 2005", 22 pgs.
"U.S. Appl. No. 09/740,502, Response filed Jul. 5, 2007 to Final Office Action mailed Apr. 19, 2007", 5 pgs.
"U.S. Appl. No. 09/740,502, Response filed Sep. 10, 2009 to Non Final Office Action mailed Jun. 10, 2009", 13 pgs.
"U.S. Appl. No. 09/740,502, Response filed Oct. 22, 2007 to Final Office Action mailed Apr. 19, 2007", 10 pgs.
"U.S. Appl. No. 09/740,502, Response filed Oct. 30, 2008 to Non-Final Office Action mailed Jul. 31, 2008", 17 pgs.
"U.S. Appl. No. 09/740,502, Response filed Nov. 8, 2005 to Non Final Office Action mailed Aug. 8, 2005", 27 pgs.
"U.S. Appl. No. 09/740,502, Response filed Dec. 16, 2004 Non-Final Office Action mailed Sep. 16, 2004", 25 pgs.
"U.S. Appl. No. 10/746,583, Final Office Action mailed Apr. 28, 2010", 14 pgs.
"U.S. Appl. No. 10/746,583, Final Office Action mailed Jul. 29, 2013", 18 pgs.
"U.S. Appl. No. 10/746,583, Non Final Office Action mailed Jan. 24, 2013", 15 pgs.
"U.S. Appl. No. 10/746,583, Non Final Office Action mailed Jul. 27, 2012", 15 pgs.
"U.S. Appl. No. 10/746,583, Non-Final Office Action mailed Jun. 3, 2008", 6 pgs.
"U.S. Appl. No. 10/746,583, Non-Final Office Action mailed Oct. 15, 2009", 13 pgs.
"U.S. Appl. No. 10/746,583, Non-Final Office Action mailed Dec. 10, 2008", 12 pgs.
"U.S. Appl. No. 10/746,583, Response filed Jan. 15, 2010 to Non Final Office Action mailed Oct. 15, 2009", 13 pgs.
"U.S. Appl. No. 10/746,583, Response filed Mar. 10, 2009 to Non-Final Office Action mailed Dec. 10, 2008", 16 pgs.
"U.S. Appl. No. 10/746,583, Response filed Apr. 24, 2013 to Non Final Office Action mailed Jan. 24, 2013", 9 pgs.
"U.S. Appl. No. 10/746,583, Response filed Jul. 17, 2009 to Restriction Requirement mailed Jun. 17, 2009", 8 pgs.
"U.S. Appl. No. 10/746,583, Response filed Jul. 28, 2010 to Final Office Action mailed Apr. 28, 2010", 10 pgs.
"U.S. Appl. No. 10/746,583, Response filed Sep. 3, 2008 to Non-Final Office Action mailed Jun. 3, 2008", 17 pgs.
"U.S. Appl. No. 10/746,583, Response filed Oct. 29, 2012 to Non Final Office Action mailed Jul. 27, 2012", 12 pgs.
"U.S. Appl. No. 10/746,583, Response filed Oct. 29, 2013 to Final Office Action mailed Jul. 29, 2013", 11 pgs.
"U.S. Appl. No. 10/746,583, Restriction Requirement mailed Jun. 17, 2009", 6 pgs.
"U.S. Appl. No. 11/758,196, Notice of Allowance mailed Mar. 20, 2008", 8 pgs.
"U.S. Appl. No. 11/758,196, Notice of Allowance mailed Apr. 23, 2009", 6 pgs.
"U.S. Appl. No. 11/758,196, Notice of Allowance mailed Aug. 1, 2008", 6 pgs.
"U.S. Appl. No. 11/758,196, Preliminary Amendment filed Oct. 4, 2007", 6 pgs.
"U.S. Appl. No. 11/758,196, Supplemental Preliminary Amendment filed Nov. 16, 2007", 7 pgs.
"U.S. Appl. No. 12/202,145, Amendment filed Nov. 14, 2013", 7 pgs.
"U.S. Appl. No. 12/202,145, Applicant's Summary of Examiner Interview filed Jan. 3, 2011", 1 pg.
"U.S. Appl. No. 12/202,145, Non-Final Office Action mailed May 14, 2010", 12 pgs.
"U.S. Appl. No. 12/202,145, Notice of Allowance mailed Aug. 14, 2013", 9 pgs.
"U.S. Appl. No. 12/202,145, Notice of Allowance mailed Dec. 3, 2010", 10 pgs.
"U.S. Appl. No. 12/202,145, PTO Response to 312 Communication mailed Nov. 22, 2013", 2 pgs.
"U.S. Appl. No. 12/202,145, Response filed Sep. 3, 2010 to Non Final Office Action mailed May 14, 2010", 21 pgs.
"U.S. Appl. No. 13/651,661, Advisory Action mailed Aug. 9, 2013", 2 pgs.
"U.S. Appl. No. 13/651,661, Final Office Action mailed Apr. 25, 2013", 24 pgs.
"U.S. Appl. No. 13/651,661, Non Final Office Action mailed Dec. 19, 2012", 29 pgs.
"U.S. Appl. No. 13/651,661, Notice of Allowance mailed Sep. 12, 2013", 28 pgs.
"U.S. Appl. No. 13/651,661, Response filed Mar. 19, 2013 to Non Final Office Action mailed Dec. 19, 2012", 10 pgs.
"U.S. Appl. No. 13/651,661, Response filed Jul. 26, 2013 to Final Office Action mailed Apr. 25, 2013", 11 pgs.
"U.S. Appl. No. 13/651,661, Response filed Aug. 26, 2013 to Advisory Action mailed Apr. 25, 2013", 11 pgs.
"Beyond.com Adds Customer Ratings to Web Site; First Internet Store to Post Comprehensive Online Buyers' Guide to Software", Business Wire; New York, (Nov. 16, 1998), 2 pages.
"BuyClearance.com—The Internet Clearance Superstore: Product Information", [Online]. Retrieved from the Internet: <URL: http://web.archive.org/web/20000124120021/www.buy.com/clearance/product.asp?sku=70000254>, (Accessed Aug. 29, 2003), 1 pg.
"Celebrating Its Third Year Anniversary eBay Sets Standard for Online Person-To-Person Trading", PR Newswire, New York, (FeedbackForum) downloaded from ProQuest Direct on the Internet on May 9, 2010, (Sep 15, 1998.), p. 1.
"Chinese Application Serial No. 01822389.3, Office Action mailed Mar. 9, 2007", with English translation of claims, 9 pgs.
"Chinese Application Serial No. 01822389.3, Response filed Jul. 24, 2007 to Office Action mailed Mar. 9, 2007", with English translation of claims, 19 pgs.
"Development of a Supporting System for Group Use of Personal Connections Using Collaborative Agents", Technical Report of IEICE, (1996), 31-36.
"Ebay Community chat", ebay.com webpage from web.archive.org, (Dec. 12, 2000), 1-2.

(56) References Cited

OTHER PUBLICATIONS

"eBay Feedback Removal Policy", eBay, [Online] Retrieved from the Internet: <URL: http://pages.ebay.com/help/community/fbremove.html>, (Archived Jun. 19, 2000), 3 pgs.
"eBay Help: Basics : FAQ : Feedback", ebay.com webpage from web.archive.org, (Oct. 12, 1999), 1-3.
"eBay Help: community Standards: eBay Help: Rules and safety", ebay.com webpage from web.archive.org, (Aug. 1, 2000), 1-2.
"eBay Leave Feedback about an eBay User", ebay.com webpage from web.archive.org, (Aug. 25, 1999), 1-2.
"ebay Listings : Cufflinks, Studs", ebay.com webpage from web.archive.org, (Feb. 8, 2001), 1-3.
"ebay: The ebay Q&A Board", ebay.com webpage from web.archive.org, (Oct. 3, 2000), 1-21.
"EP Application Serial No. 01274337.3, Written Submission filed Oct. 4, 2012 to EP Summons to Attend Oral Proceedings mailed Jul. 23, 2012", 16 pgs.
"Epinions.com", [Online]. Retrieved from the Internet: <http://web.archive.org/web/19991129024603/www.epinions.com/>, (1999), 35 pgs.
"European Application Serial No. 01274337.3, Decision to Refuse mailed Apr. 8, 2013", 12 pgs.
"European Application Serial No. 01274337.3, European Search Report mailed Nov. 15, 2005", 2 pgs.
"European Application Serial No. 01274337.3, Office Action Mailed Feb. 13, 2009", 4 pgs.
"European Application Serial No. 01274337.3, Response filed Aug. 24, 2009 to Office Action mailed Feb. 13, 2009", 37 pgs.
"European Application Serial No. 01274337.3, Summons to Attend Oral Proceedings mailed Jul. 23, 2012", 8 pgs.
"European Application Serial No. 01913244.8, Office Action mailed Sep. 16, 2005", 1 pg.
"European Application Serial No. 01913244.8, Office Action mailed Nov. 18, 2005", 6 pgs.
"European Application Serial No. 01913244.8, Response filed Apr. 28, 2006 to Office Action mailed Nov. 18, 2005", 10 pgs.
"European Application Serial No. 01913244.8, Search Report mailed Sep. 14, 2005", 2 pgs.
"European Application Serial No. 01913244.8, Summons to Attend Oral Proceedings mailed Nov. 15, 2010", 11 pgs.
"Feedback Overview and Feedback Forum", [Online]. Retrieved from the Internet: <URL: www.ebay.com>, (1999), 4 pages.
"Frequently Asked Questions about Feedback Forum", via the Wayback Machine, [Online]. Retrieved from the Internet: <URL: www.archive.org/web/19991122031437/http://pages.ebay.com/help/basics/f-feedback.html#3>, (Nov. 10, 1999), 3 pgs.
"Give some feedback on an AuctionWeb user", [Online]. Retrieved from the Internet: <URL: http://web.archive.org/web/19981203032739/www2ebay.com/aw/user-feedback.html>, (May 18, 2005), 2 pgs.
"Home builder has customer satisfaction as its cornerstone", Daily Herald; Arlington Heights, Chrystal Caruthers Daily Herald Business Writer., Copyright Paddock Publication, (Nov. 25, 1998), 2 pages.
"International Application Serial No. PCT/US00/17136 International Search Report mailed Nov. 16, 2000", 6 pgs.
"International Application Serial No. PCT/US01/06709, International Preliminary Examination Report mailed Mar. 25, 2002", 14 pgs.
"International Application Serial No. PCT/US01/06709, International Search Report mailed Sep. 10, 2001", 2 pgs.
"International Application Serial No. PCT/US01/12398 International Search Report mailed Aug. 27, 2001", 3 pgs.
"International Application Serial No. PCT/US01/50499, International Preliminary Examination Report mailed Dec. 3, 2004", 4 pgs.
"Leave Feedback about a eBay User", Retrieved on Jan. 20, 2006 from wayback machine, [Online]. Retrieved from the Internet: <URL: http://web.archive.org/web/19990825071501/cgi2.ebay.com/aw-cgi/eBayISAPI.dll>, (Nov. 10, 1999), 5 pgs.
"Leaving Feedback", Wayback Machine Internet archive, [Online]. Retrieved from the Internet: <URL: http://pages.ebay.com/help/feedback/questions/leaving-feedback.html>, (Nov. 10, 1999), 3 pages.
"Meg Muscles eBay Uptown, Fortune", Special Report downloaded from ProQuest Direct on the Internet on May 9, 2010, 7 pages, (Jul. 5, 1999), 81-88.
"MTB Review", [Online]. Archived [Jan. 25, 1997] Retrieved from the Internet: <URL: http://web.archive.org/web/19970125123339/http://www.mtbr.com/>, (Accessed Jan. 27, 2005), 9 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"PlanetAll Plans to Make a World of Difference in Busy Lives", PR Newswire, Financial News, (Nov. 13, 1996), 1-3.
"See the Feedback Profile of an eBay User", ebay.com webpage from web.archive.org, (Dec. 5, 2000), 1.
"Sixdegrees.com", web.archive.org, [Online]. Retrieved from the Internet: <URL: http://lweb.an:hive.orglweb/19971210214122/http://www. sixdegrees.coml( 1/10/20 11 > (Jan. 19, 2000), 1-15.
"Social Network", Wikipedia, [Online]. Retrieved from the Internet: <URL: http://en.wikipedia.org/wiki/Soical_networking>, (Archived Apr. 1, 2004), 1-7.
"The Feedback Forum", ebay.com webpage from web.archive.org, (Dec. 17, 2000), 1-2.
"The Feedback Forum: FAQ", eBay, [Online]. Retrieved from the Internet: <URL: http://web.archive.org/web/19991012230420/pages.ebay.com/help/basics/f-feedback.html>, (Archived Oct. 12, 1999), 4 pgs.
Abdul-Rahman, A., et al., "Supporting Trust in Virtual Communities", Proceedings of the 33rd Hawaii International Conference on System Sciences, 6(6), (2000), 1-25.
Abdul-Rahman, Alfarez, et al., "Using Recommendations for Managing Trust in Distributed Systems", IEEE Malaysia International Conference on Communication, (1997), 1-7.
Aberer, Karl, et al., "Managing Trust in a Peer-2-Peer Information System", Proceedings of the tenth international conference on Information and knowledge management, Atlanta, Georgia, USA, (2001), 310-317.
Aho, A. V., "Directed Graphs", Date Structures And Algorithms, Addison—Wesley Publishing Company, Menlo Park, California, (1983), 198-219.
Aho, Alfred V., "Data Structures and Algorithms: Chapter 3 Trees", Addison-Wesley Publishing Company, Menlo Park, California, (1983), 75-89.
Alexander, Steve, "Digital auction: Concept is attracting traditional, new media Star Tribune (Minneapolis, MN)", (Mar. 1, 1998), 1-6.
Annen, Kurt, "Social Capital, Inclusive Networks, and Economic Performance", Journal of Economic Behavior & Organization, vol. 50, Issue 4, (2003), 1-27.
audioreview.com, "NAD 412 Reviews, Found on WayBackMachine", Online Reviews, [Online]. Retrieved from the Internet: <URL: http://web.archive.org/web/19990203004345/www.audioreview.com/reviews/Turner/nad_412_turner.shtml>, (Feb. 3, 1995), 9 pgs.
Barrett, Alexandra, "What's Your Epinion? On Epinion.com, read product reviews by regular folks, then post your own", Network World, (Sep. 13, 1999), 2 pgs.
Baumann, G. W, "Personal Optimized Decision/Transaction Program", IBM Technical Disclosure Bulletin, (Jan. 1995), 83-84.
beyond.com, "IMS Web Spinner Personal V1.26 for Win95/98/NT", [Online]. Retrieved from the Internet: <URL: http://web.archive.org/web/20000125152017/www.beyond.com/PKSN104373/prod.htmcrewiew>, (1998-2000), 3 pages.
Business Wire, "Mediappraise Receives National Award For Web-based Technology That Enables Companies to Solve Thorny HR Problem", Business Wire, (Dec. 14, 1998), 1-2.

(56) References Cited

OTHER PUBLICATIONS

Cann, A. J., "Innovations in Education and Training International", Journal Paper, Vo. 36, Routledge, United Kingdom, (Feb. 1999), 44-52.

Carter, Jonathan, et al., "Reputation Formalization Within Information Sharing Multiagent Architectures", Computational Intelligence, 2(5), (2002), 45-64.

Chicago Tribune, "Amazon.com expands into toys, electronics", Chicago Tribune, (Jul. 14, 1999), 3;1.

Clemons, E., "Evaluating the prospects for alternative electronic securities", Proceedings of ICIS 91: 12th International Conference on Information Systems, (Dec. 16-18, 1991), 53-63.

Consumer Review!, "49,000 Product Reviews by Consumers for Consumers", [Online]. Retrieved from the Internet: <URL: http://web.archive.org/web/19981206010249/http://www.consumer-review.com>, (1996-1998), 22 pgs.

Dellarocas, C., "Immunizing online reputation reporting systems against unfair ratings and discriminatory behaviour", Proceedings of the 2nd ACM conference on Electronic commerce, (2000), 150-157.

Dellarocas, C., "The Digitization of Word-of-Mouth: Promise and challenges of Online Reputation Mechanisms", Sloan School of Management, MIT, (Oct. 1, 2003), 1-38.

Dellarocas, Chrysanthos, "Mechanisms for coping with unfair ratings and discriminatory behavior in online reputation reporting systems", Proceedings of the Twenty First International Conference on Information Systems, (2000), 520-525.

Dellarocas, Chrysanthos, "The Design of Reliable Trust Management Systems for Electronic Trading Communities", Working Paper, Sloan School of Management, Massachusetts Institute of Technology, (2001), 1-45.

Donath, J., "Identity and Deception in the Virtual Community", In Kollock, P. and Smith, M. (Eds.) Communities in Cyberspace: Perspectives on New Forms of Social Organization. Berkeley: University of California Press, MIT Media Lab, (1997), 1-25.

Ekstrom, Martin, "A rating system for AEC e-bidding", (Nov. 27, 2000), 1-17.

Festa, Paul, "Have an Epinion?", CNET News.com, Online Article, http://news.com.com/2100-1023-228193.html, (Jul. 9, 1999), 2 pages.

Foner, Leonard Newton, "Political Artifacts and Personal Privacy: The Yenta Multi-Agent Distributed Matchmaking System", (1999), 8 pgs.

Foner, Leonard N, "Yenta: A Multi-Agent, Referral-Based Matchmaking System", MIT Media Lab/AMC, retrieved from Google Scholar, (1997), 301-307.

Friedman, Eric, "Robust Social Norms in Bargains and Markets", Draft, Rutgers University, (1999), 1-23.

Friedman, Eric, et al., "The Social Cost of Cheap Pseudonyms", Journal of Economics and Management Strategy, 10(2), (2000), 173-199.

Graham, Ian, "The Emergence of Linked Fish Markets in Europe", Electronic Markets. vol. 8, No. 2, (1998), 29-32.

Guglielmo, Connie, "BizRate Lets Consumers Rate Sites", Interactive Week, 4(22), (Aug. 4, 1997), 4 pgs.

Hanneman, Robert A, "Introduction to Social Network Methods", On-line textbook, Riverside, CA: University of California, Riverside, (2001), 1-150.

Harris, Donna, "Product Helps Dealer Reward Loyal Customers", Automotive News, vol. 73, Issue 5801, (Jan. 11, 1999), p. 38, 1/9 p.

Hauser, R., "Anonymous Delivery of Goods in Electronic Commerce", IBM Technical Disclosure Bulletin, 39(3), (Mar. 1996), 363-366.

Hess, C. M, et al., "Computerized Loan Organization System: An Industry Case Study of the Electronic Markets Hypothesis", MIS Quarterly, vol. 18(3), (Sep. 1994), 251-275.

Jordan, Ken, "The Augmented Social Network: Building identity and trust into the next-generation Internet", first monday, peer-previewed journal on the Internet [Online]. Retrieved from the Internet: <URL: http://www.firstmonday.dk/issues/issue8_8/jordan/>, (Archived Aug. 2, 2003), 1-66.

Kautz, Henry, et al., "Agent Amplified Communication", Proceedings of the 13th National Conf on Artificial Intelligence and the 8th Innovative Applications of Artificial Intelligence Conference, vol. 1, (1996), 3-9.

Kautz, Henry, et al., "Referral Web: Combining Social Networks and Collaborative Filtering", Communications of the ACM, 40(3), (Mar. 1997), 63-65.

Kautz, Henry, et al., "The Hidden Web", AI Magazine, vol. 18, No. 2, (1997), 27-36.

Kautz, Henry, et al., "Welcome to . . . ReferralWeb", (Apr. 1999), 1-44.

Klein, Stefan, "Introduction to Electronic Auctions", Focus Theme, vol. 7, No. 4, (1997), 3-6.

Kornblum, Janet, "Consumer Reports an online win", CNET News.com, Online Article, http://news.com.com/2100-1023-217386.html, (Nov. 2, 1998), 2 pgs.

Krigel, Beth Lipton, "Big changes ahead for Deja News", CNET News.com, Online Article, http://news.com.com/2100-1023-225101.html, (Apr. 28, 1999), 3 pages.

Langley, Paul A., "Building cognitive feedback into a microworld learning environment: Results from a pilot", System dynamics,—systemdynamics.org, (1995), 1 pg.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Malaga, R. A, "Web-Based Reputaton Management Systems: Problems and Suggested Solutions", vol. 1, (2001), 403-417.

Malone, T., et al., "Electronic Markets and Electronic Hierarchies", Communications of the ACM, vol. 30, No. 6, (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Meade, J., "Visual 360: A Performance Appraisal System That's 'Fun'", HR Magazine, Society for Human Resource Management., (Jul. 1999), 3 pgs.

Miller, Michael J., "The Best Products of 1999 Revealed", ZDNet, http://www.zdnet.com/anchordesk/stories/story/0,10738,5019537,00.html, (Dec, 13, 1999), 2 pgs.

Mui, L., et al., "Ratings in Distributed Systems: A Bayesian Approach", Proceedings of the Workshop on Information Technologies and Systems (WITS), (2001), 1-7.

Mui, Lik, "A Computational Model of Trust and Reputation", Proceedings of the 35th Hawaii International Conference on System Sciences—2002, (2002), 9 Pages.

Neo, B. S, "The implementation of an electronic market for pig trading in Singapore", Journal of Strategic Information Systems; vol. 1(5), (Dec. 1992), 278-288.

Nielsen, Jakob, "Reputation Managers are Happening", useit.com, Alertbox, (Sep. 5, 1999), 4 pages.

Ono, C., et al., "Trust-Based Facilitator for e-Partnerships", Proceedings of the Fifth International Conference on Autonomous Agents, (2001), 108-109.

Patience, Nick, "Epinons Launches Online Shopping Guide Built on Trust", Computergram International, 3744, The Gale Group Newsletter, (Sep. 10, 1999), 2 pgs.

Post, D. L, et al., "Application of auctions as a pricing mechanism for the interchange of electric power", IEEE Transactions on Power Systems, 10(3), (Aug. 1995), 1580-1584.

Preist, Chris, et al., "Adaptive Agents in a Persistent Shout Double Auction", International Conference on Information and Computation Economies, Proceedings of the first international conference on Information and computation economies, (1998), 11-18.

pricescan.com, "PriceSCAN: Your Unbiased Guide to the Lowest Prices on Books, Computers, Electronic . . . ", [Online]. Retrieved

(56) References Cited

OTHER PUBLICATIONS from the Internet: <URL: http://web.archive.org/web/19991117123352/www.pricescan.com>, (1997-99), 1 page.

Product ReviewNet!, "Welcome to Product ReviewNet! The Premier Online Source for Product Review Abstracts", [Online]. Archived [Dec. 1, 1998]. Retrieved from the Internet: <URL: http://web.archive.org/web/19981201205356/www.productreviewnet.com/splash.html>, (1998), 1 pg.

Product ReviewNet!, "Welcome to Product ReviewNet! Your Source for Product Review Information", [Online]. Archived [Nov. 14, 1999]. Retrieved from the Internet: <URL: http://web.archive.org/web/19991114054251/www.productreviewnet.com/splash.html>, (1999), 1 page.

Pujol, Josep M, "Extraxting Reputation in Multi Agent Systems by Means of Social Network Topology", Proceedings of the first international joint conference on Autonomous agents and multiagent systems, (2002), 8 Pages.

Rasmusson, Lars, "Simulated Social Control for Secure Internet Commerce", Proceedings of the 1996 Workshop on New Security Paradigms, Lake Arrowhead, California, United States, (Apr. 1, 1996), 18-25.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Resnick, P., et al., "Trust among Strangers in Internet Transactions: Empirical Analyses of eBay's Reputation System", NBER Workshop, (Feb. 5, 2001), 1-26.

Resnick, Paul, "Reputation systems", Communications of the ACM, 43(12), (Dec. 2000), 45-48.

Rockoff, T. E, et al., "Design of an Internet-based system for remote Dutch auctions", Internet Research: Electronic Networking Applications and Policy, vol. 5(4), (Jan. 1, 1995), 10-16.

Sabater, Jordi, "Regret: A reputation model for gregarious societies", IIIA—Artificial Intelligence Research Intitute, CSIC, [Online]. Retrieved from the Internet: <URL: http://citeseerx.ist.psu.edu/viewdoc/download?doi=10.1.1.88.797&rep=rep1&type=pdf>, (1999), 9 pgs.

Sabater, Jordi, et al., "Reputation and Social Network Analysis in Multi-Agent Systems", Proceedings of the first international joint conference on Autonomous agents and multiagent systems: part 1 table of contents. Session: SESSION 2D: group and organizational dynamics, (2002), 475-482.

Schmid, B. F, "The Development of Electronic Commerce", EM—Electronic Markets, No. 9-10, (Oct. 1993), 2 pgs.

Schneider, Jay, et al., "Disseminating Trust Information in Wearable Communities", 2nd International Symposium on Handheld and Ubitquitous Comput- 10 ing (HUC2K), (2000), 1-5.

Shah, M.A., "Referral Web: A Resource location system guided by personal relations", Masters thesis, M.I.T., (May 1997), 1-47.

Siegmann, Ken, "Nowhere to go but up", PC Week; vol. 12(42), Ziff-Davis Publishing Company, (Oct. 23, 1995), 1-3.

Slavin, Robert E, et al., "Improving Intergroup Relations: Lessons Learned from Cooperative Learning Programs", Journal of Social Issues, (1999), 1-25.

Svensson, Lars, "Discursive evaluation in a distributed learning community", Australian Journal of Educational Technology—Citeseer, (2002), 11 pgs.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Vendelo, Morten Thanning, "Narrating Corporate Reputation: Becoming Legitimate Through Storytelling", International Studies of Management & Organization v28n3, (Fall 1998), 120-137.

Venkatraman, Mahadevan, et al., "Trust and Reputation Management in a Small-World Network", Proceedings of the Fourth International Conference on MultiAgent Systems (ICMAS-2000), (2000), 1-2.

Vivian, Nathan, "Social Networks in Transnational and Virtual Communities", Informing Science, InSITE—"Where Parallels Intersect", (Jun. 2003), 1431-1437.

Warbelow, A, et al., "Aucnet: TV Auction Network System", Harvard Business School Case/Study, HBVR#9-190-001, USA, (Jul. 1989), 1-16.

Wellman, Barry, "An Electronic Group is Virtually a Social Network", almost final version of Chapter 9 in Sara Kiesler, ed., Culture of the Internet, Hillsdale, NJ: Lawrence Erlbaum, (1997), 26 Pages.

Wolverton, Troy, "Productopia launches product review site", CNET News.com, http://news.com.com/2100-1017-228811.html, (Jul. 21, 1999), 2 pages.

Yu, Bin, et al., "A Social Mechanism of Reputation Management in Electronic Communities", Proceedings of the 4th International Workshop on Cooperative Information Agents IV, The Future of Information Agents in Cyberspace, (2000), 154-165.

Zacharia, Giorgis, et al., "Collaborative Reputation Mechanism in Electronic Marketplaces", IEEE, (1999), 1-7.

Zacharia, Giorgos, et al., "Collaborative Reputation Mechanisms in Electronic Marketplaces", Proceedings of the 32nd Hawaii International Conference on System Sciences, (1999), 1-7.

Zachiara, et al., "Collaborative reputation mechanisms for electronic marketplaces", Decision support systems, vol. 29, (Dec. 2000), 371-388.

Zwass, V., "Electronic Commerce: Structures and Issues", International Journal of Electronic Commerce, Fall 1996, vol. 1, No. 1, (Fall 1996), 3-23.

"U.S. Appl. No. 10/746,583, Non Final Office Action mailed Dec. 4, 2013", 18 pgs.

"U.S. Appl. No. 10/746,583, Response filed Mar. 4, 2014 to Non Final Office Action mailed Dec. 4, 2014", 11 pgs.

"International Application Serial No. PCT/US01/50499, International Search Report mailed Apr. 23, 2004", 2 pgs.

"International Application Serial No. PCT/US01/50499, Written Opinion mailed Nov. 3, 2004", 5 pgs.

Ba, Sulin, et al., "Evidence of the effect of trust building technology in electronic markets: Price premiums and buyer behavior", MIS quarterly, vol. 26, No. 3, (Sep. 2002), 246-268.

Guth, Werner, et al., "The Coevolution of Trust and Institutions in Anonymous and Nonanonymous Communities", Max Planck Institute for Research into Economic Systems, [Online]. Retrieved from the Internet: <URL: http://papers.econ.mpg.de/esi/discussionpapers/2002-07>, (Mar. 1, 2002), 21 pgs.

Ockenfels, Axel, "New Institutional Structures on the Internet: The Economic Design of Online Auctions", Max Planck Institute for Research into Economic Systems, [Online]. Retrieved from the Internet: <URL: papers.econ.mpg.de>, (Mar. 1, 2002), 25 pgs.

Tosi, Henry, "The effects of expectation levels and role consensus on the buyer-seller dyad", The Journal of Business, vol. 39, No. 4, (Oct. 1966), 516-529.

"U.S. Appl. No. 10/746,583, Examiner Interview Summary mailed May 4, 2015", 3 pgs.

"U.S. Appl. No. 10/746,583, Final Office Action mailed Jun. 13, 2014", 20 pgs.

"U.S. Appl. No. 10/746,583, Final Office Action mailed Jul. 23. 2015", 32 pgs.

"U.S. Appl. No. 10/746,583, Non Final Office Action mailed Mar. 23, 2015", 26 pgs.

"U.S. Appl. No. 10/746,583, Response filed Jun. 23, 2015 to Non Final Office Action mailed Mar. 23, 2015", 20 pgs.

"U.S. Appl. No. 10/746,583, Response filed Sep. 15, 2014 to Final Office Action mailed Jun. 13, 2014", 12 pgs.

"U.S. Appl. No. 13/722,739, Notice of Allowance mailed Aug. 29, 2014", 9 pgs.

"U.S. Appl. No. 13/722,739, Notice of Allowance mailed Dec. 22, 2014", 5 pgs.

(56) References Cited

OTHER PUBLICATIONS

"U.S. Appl. No. 14/159,272, Preliminary Amendment filed Apr. 11, 2014", 7 pgs.
"U.S. Appl. No. 14/282,812, Preliminary Amendment filed Jun. 2, 2014", 7 pgs.
"U.S. Appl. No. 14/283,009, Preliminary Amendment filed Jun. 2, 2014", 7 pgs.
"U.S. Appl. No. 14/283,029, Preliminary Amendment filed Jun. 2, 2014", 7 pgs.
"U.S. Appl. No. 14/283,059, Preliminary Amendment filed Jun. 2, 2014", 7 pgs.
"U.S. Appl. No. 14/283,081, Preliminary Amendment filed Jun. 2, 2014", 7 pgs.
"U.S. Appl. No. 14/690,635, Pre-Interview First Office Action mailed Jul. 15, 2015", 4 pgs.
"U.S. Appl. No. 14/690,635, Preliminary Amendment filed Apr. 23, 2015", 6 pgs.
"U.S. Appl. No. 14/690,635, Supplemental Amendment filed May 13, 2015", 7 pgs.
"Application Serial No. 148282,962, Preliminary Amendment filed Jun. 2, 2014", 7 pgs.
Akerlof, George A, "The market for lemons": Quality uncertainty and the market mechanism, The quarterly journal of economics, (1970), 14 pgs.
Greif, A, "Reputation and coalitions in medieval trade: evidence on the Maghribi traders", The journal of economic history, (1989), 27 pgs.
"U.S. Appl. No. 10/746,583, Examiner Interview Summary mailed Aug. 24, 2015", 3 pgs.
"U.S. Appl. No. 10/746,583, Response filed Oct. 23, 2015 to Final Office Action mailed Jul. 23, 2015", 19 pgs.
"U.S. Appl. No. 14/690,635, Notice of Allowance mailed Sep. 23, 2015", 12 pgs.
"U.S. Appl. No. 14/690,635, Response to Pre-Interview First Office Action filed Sep. 15, 2015", 8 pgs.

\* cited by examiner

FEEDBACK TABLE 52

| USER ID | TOTAL SCORE | TOTAL NEGATIVE | TOTAL POSITIVE | NO. OF RETRACTIONS |
|---|---|---|---|---|
| 74 | 76 | 78 | 80 | 82 |

FIG. 4

FEEDBACK DETAILS TABLE 53

| ITEM NO. | COMMENT | TYPE | DATE | RESPONSE | REBUTTAL | COMMENTOR (USER ID) | COMMENTEE (USER ID) |
|---|---|---|---|---|---|---|---|
| 84 | 86 | 88 | 90 | 92 | 94 | 96 | 98 |

FIG. 5

Leave Feedback about a User
To leave feedback, enter your comment and select the "Leave Feedback" button on the bottom of the page.

| You have 100 Feedbacks to leave. | Filter by User ID or Item# | | Go |
|---|---|---|---|
| User ID | Item# | Item | Ended |
| skippy1 (-45) | 226164216 | 1933 Goudey # 220 Lefty Grove | 01/10 23:10 |

Is your comment positive, negative, or neutral?
○ positive  ○ negative  ○ neutral  ● Don't leave feedback now

[                                                                    ]
Your comment (max. 80 characters)

| pete1 (-45) | 226164217 | Book - War and Peace | 01/9 23:10 |

Is your comment positive, negative, or neutral?
○ positive  ○ negative  ○ neutral  ○ Don't leave feedback now

[                                                                    ]
Your comment (max. 80 characters)

| mark1 (-45) | 226164218 | Beanie Baby | 01/12 8:00 |

Is your comment positive, negative, or neutral?
○ positive  ○ negative  ○ neutral  ○ Don't leave feedback now

[                                                                    ]
Your comment (max. 80 characters)

| Leave Feedback | for all selected Items on this page | <Previous Items | More Items> |

FIG. 10

Leave Feedback about a User
To leave feedback, enter your comment and select the "Leave Feedback" button on the bottom of the page.

You have 100 Feedbacks to leave.　　Filter by User ID or Item# [          ] [Go]

| User ID | Item# | Item | Ended |
|---|---|---|---|
| 230 skippy1 (-45) | 226164216 | 1933 Goudey # 220 Lefty Grove | 01/10 23:10 |

Is your comment positive, negative, or neutral?
○ positive　　○ negative　　○ neutral　　⦿ Don't leave feedback now

[                                                          ]
Your comment (max. 80 characters)

skippy1 (-45)　　226164216　　Car - Dodge Stratus　　01/13 12:00
Is your comment positive, negative, or neutral?
○ positive　　○ negative　　○ neutral　　○ Don't leave feedback now

[                                                          ]
Your comment (max. 80 characters)

skippy1 (-45)　　226164216　　Baseball Bat　　01/24 7:54
Is your comment positive, negative, or neutral?
○ positive　　○ negative　　○ neutral　　○ Don't leave feedback now

[                                                          ]
Your comment (max. 80 characters)　　　　　　　　　　246　　248

[Leave Feedback] ~244 for all selected items on this page　[<Previous Items] [More Items>]

Leave Feedback about a User
To leave feedback, enter your comment and select the "Leave Feedback" button on the bottom of the page.

You have 100 Feedbacks to leave.

| User ID | Item# | Item | Ended |
|---|---|---|---|
| 230 skippy1 (-45) | 226164216 | 1933 Goudey # 220 Lefty Grove | 01/10 23:10 |

Is your comment positive, negative, or neutral?
○ positive  ○ negative  ○ neutral  ● Don't leave feedback now

[                                                    ]
Your comment (max. 80 characters)

| pete1 (-45) | 226164217 | Book - War and Peace | 01/9 23:10 |

Is your comment positive, negative, or neutral?
○ positive  ○ negative  ○ neutral  ○ Don't leave feedback now

[                                                    ]
Your comment (max. 80 characters)

| mark1 (-45) | 226164218 | Beanie Baby | 01/12 8:00 |

Is your comment positive, negative, or neutral?
○ positive  ○ negative  ○ neutral  ○ Don't leave feedback now

[                                                    ]
Your comment (max. 80 characters)

[Leave Feedback] ~244 for all selected items on this page

Negative or Neutral Feedback Confirmation

You are trying to leave a NEGATIVE <or NEUTRAL> comment for USER 2 regarding item # 3, "Item Title".

< -----Display Comment Here----- >

If this is not correct, please go gack to the previous page to edit your comment or rating.

---

You are trying to leave a NEGATIVE <or NEUTRAL> comment for USER 2 regarding item # 3, "Item Title".

< -----Display Comment Here----- >

If this is not correct, please go gack to the previous page to edit your comment or rating.

---

You are trying to leave a NEGATIVE <or NEUTRAL> comment for USER 2 regarding item # 3, "Item Title".

< -----Display Comment Here----- >

If this is not correct, please go gack to the previous page to edit your comment or rating.

---

Click once to [ Leave Feedback ] on all these items

WARNING: You CANNOT retract the comment you leave.

For this reason, we encourage you to contact your trading partner directly by e-mail or by telephone before leaving a negative feedback comment. Usually, a misunderstanding or dispute can be resolved by telephone. You can request another person's contact information by clicking here.

FIG. 13

METHODS AND SYSTEMS FOR HARVESTING COMMENTS REGARDING USERS ON A NETWORK-BASED FACILITY

RELATED APPLICATIONS

This application is a continuation of U.S. patent application Ser. No. 12/202,145, filed on Aug. 29, 2008, which is a continuation of U.S. patent application Ser. No. 11/758,196, filed on Jun. 5, 2007, and issued as U.S. Pat. No. 7,587,359 on Sep. 8, 2009, which is a continuation of U.S. patent application Ser. No. 09/515,575, filed on Feb. 29, 2000, and issued as U.S. Pat. No. 7,428,505 on Sep. 23, 2008, the benefit of priority of each of which is claimed hereby, and each of which are incorporated by reference herein in its entirety.

TECHNICAL FIELD

The present application relates generally to data processing.

BACKGROUND

In addition to access convenience, one of the advantages offered by network-based transaction facilities (e.g., business-to-business, business-to-consumer and consumer-to-consumer Internet marketplaces and retailers) and on-line communities is that participants within such facilities or communities may provide feedback to the facility, to other users of the facility and to members of an on-line community regarding any number of topics.

For example, an Internet-based retailer may provide a feedback mechanism whereby customers may provide feedback, in the form of comments or opinions, regarding goods or services offered for sale by the retailer. An Internet-based bookstore may, for example, provide a feedback mechanism whereby comments or opinions regarding particular books may he submitted via a website operated by the book retailer. Such comments are then displayed within a web page, pertaining to the relevant book, generated by the Internet-based book retailer. Such comments and feedback are useful in assisting a purchaser with a buying decision.

For users of a network-based transaction facility, such as an Internet-based auction facility, feedback regarding other users is particularly important for enhancing user trust of the transaction facility. Indeed, a history of positive feedback for a trader that routinely uses an Internet-based auction facility may be particularly valuable and useful in providing other traders with a degree of confidence regarding a specific trader. Accordingly, a positive feedback history may establish the credibility and trustworthiness of a particular trader within an on-line trading community. Similarly, a history of negative feedback may discourage other traders from transacting with a specific trader.

BRIEF DESCRIPTION OF THE DRAWINGS

The present application is illustrated by way of example and not limitation in the figures of the accompanying drawings, in which like references indicate similar elements and in which:

FIG. 4 is a diagrammatic representation of an exemplary feedback table of the database illustrated in FIG. 2.

FIG. 5 is a diagrammatic representation of all exemplary feedback details table of the database illustrated in FIG. 2.

FIG. 10 illustrates an exemplary "exceeds threshold" multiple feedback interface.

FIG. 11 illustrates an exemplary filtered multiple feedback interface, that may follow the "exceeds threshold" interface following filtering of transactions.

FIG. 12 illustrates an exemplary "does not exceed threshold" feedback interface.

FIG. 13 illustrates an exemplary "confirmation" interface.

DETAILED DESCRIPTION

A method and system for harvesting feedback information, comments and opinions regarding multiple items from users of a network-based transaction facility are described. In the following description, for purposes of explanation, numerous specific details are set forth in order to provide a thorough understanding of the present application. It will be evident, however, to one skilled in the art that the present application may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
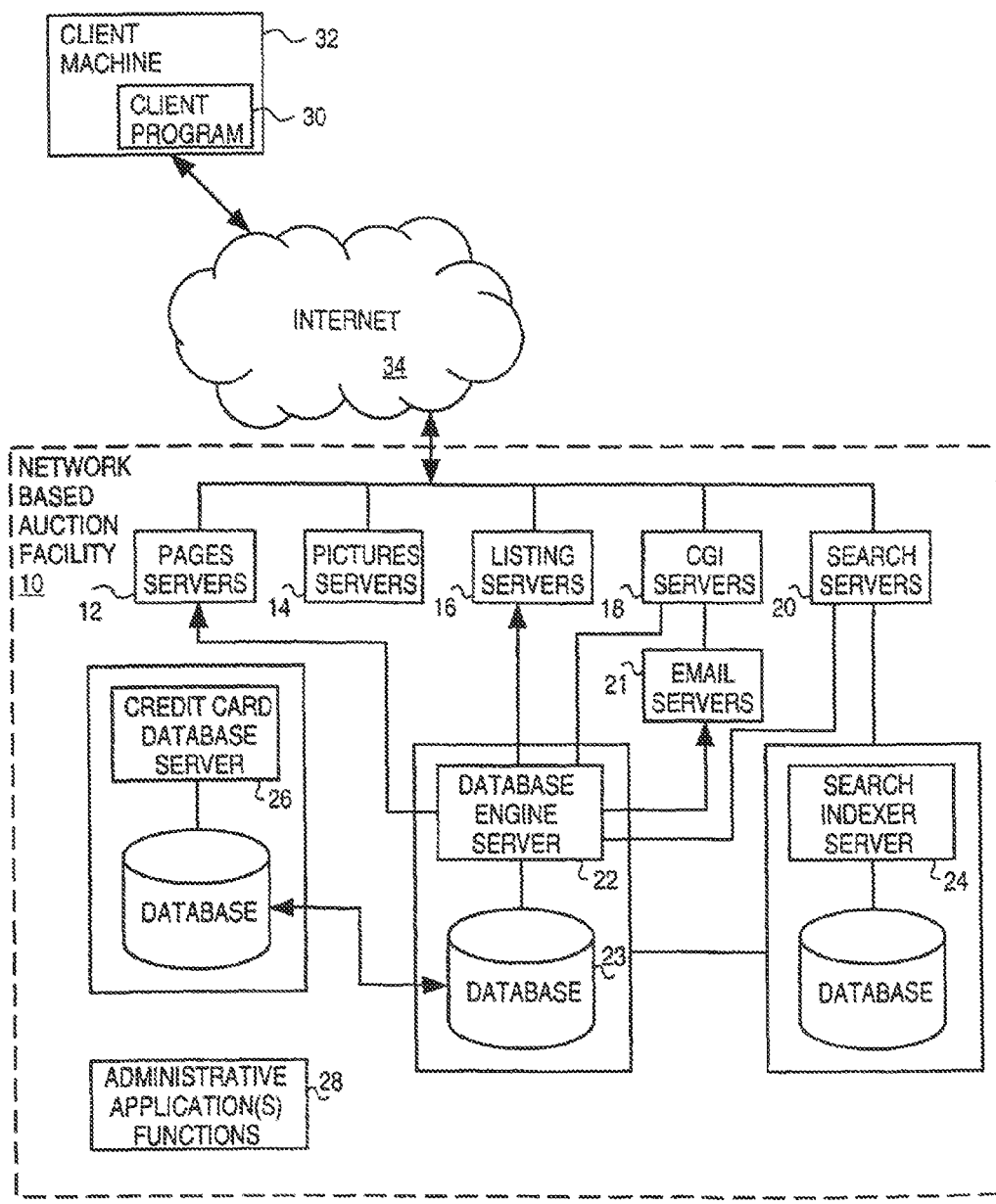
FIG. 1 is a block diagram illustrating an exemplary network-based transaction facility in the form of an internet-based auction facility.

FIG. 1 is block diagram illustrating an exemplary network-based transaction facility in the form of an Internet-based auction facility 10. While an exemplary embodiment of the present application is described within the context of an auction facility, it will be appreciated by those skilled in the art that the application will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
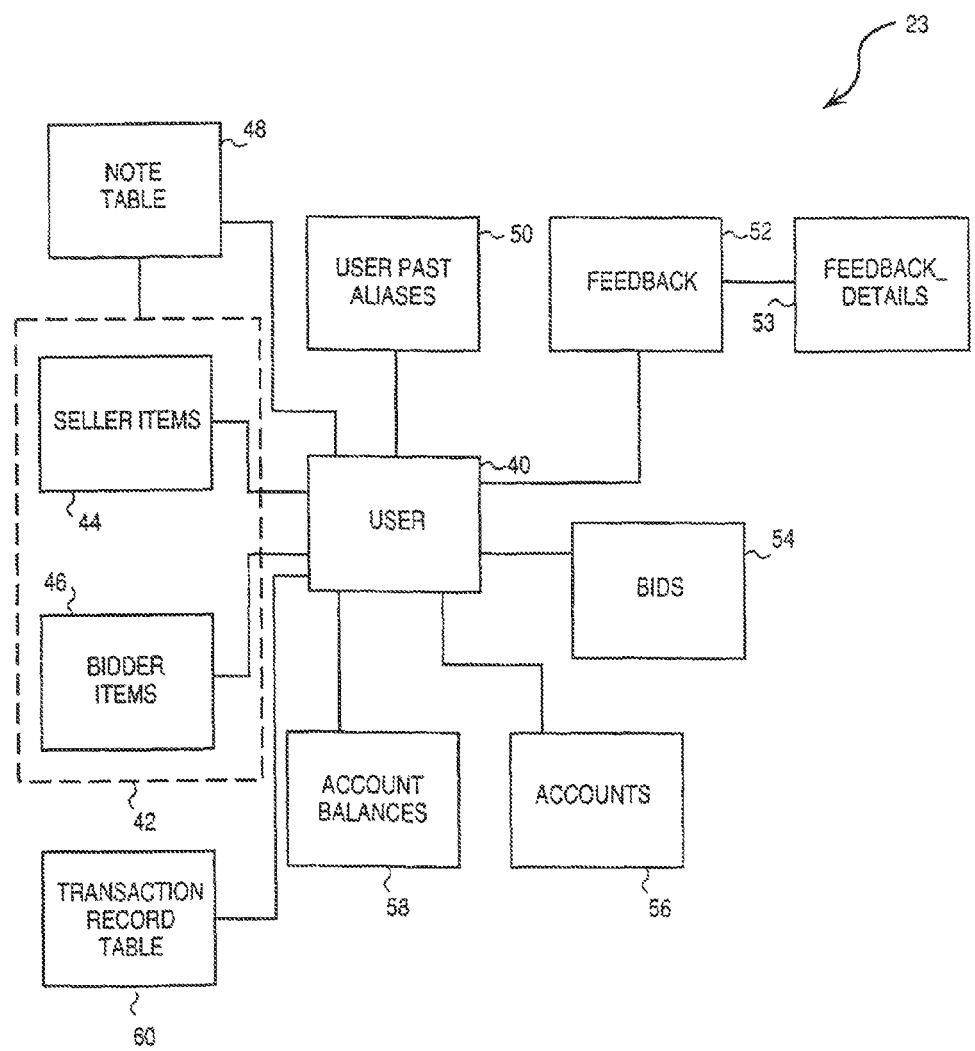
FIG. 2 is a database diagram illustrating an exemplary database for the transaction facility.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 3:
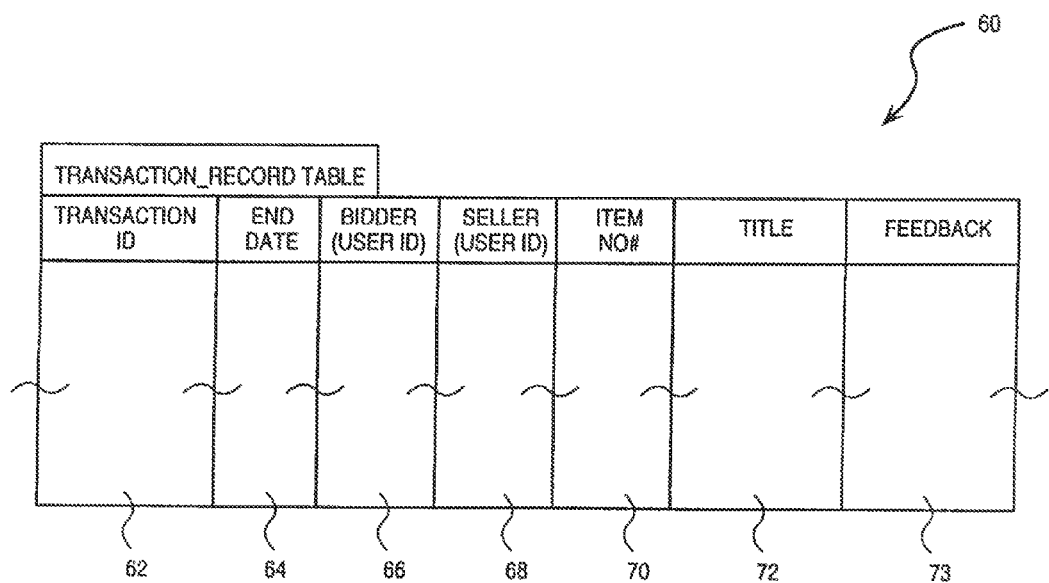
FIG. 3 is a diagrammatic representation of an exemplary transaction record table of the database illustrated in FIG. 2.

FIG. 3 is a diagrammatic representation of an exemplary embodiment of the transaction record table 60 that is populated with records, or entries, for completed, or ended, transactions (e.g., auctions) that have been facilitated by the auction facility 10. The table 60 includes a transaction identifier column 62 that stores a unique transaction identifier for each entry, and an end date column 64 that stores a date value indicating, for example, a date on which a transaction was established. A bidder column 66 stores a user identifier for a bidder (or a purchaser), the user identifier comprising a pointer to further user information stored in the user table 40. Similarly, a seller column 68 stores, for each entry, a user identifier for a seller within the relevant transaction. An item number column 70 stores, for each entry, an item number identifying the goods or service being transacted, and a title column 72 stores, for each entry, a descriptive title for the relevant transaction or for the item being transacted.

It should be noted that, in one embodiment, an entry is only created in the transaction record table 60 for transactions that have been established, for example, by the conclusion of an auction process, or by some other offer and acceptance mechanism between the purchaser and the seller.

FIG. 4 is a diagrammatic representation of an exemplary embodiment of the feedback table 52. The feedback table 52 stores summary information regarding feedback for users of the auction facility 10. The table 52 includes a user identifier column 74 that stores, for each entry, a user identifier providing a pointer to the user table 40. A total score column 76 stores, for each user entry, a total number of feedback comments (e.g., negative, positive and neutral), received for the relevant user. A total negative column 78 stores, for each user entry, the total number of negative feedback comments for the relevant user, and a total positive column 80 similarly stores, for each user entry, the total number of positive feedback comments received for that user. A number of retractions column 82 stores, for each user entry, the number of threads that the relevant user has retracted from auctions.

FIG. 5 is a diagrammatic representation of one embodiment of the feedback details table 53, that is populated with entries reflecting the details of each feedback comment or opinion submitted by a user to the auction facility 10 regarding another user or item involved in a transaction. In one exemplary embodiment, users are only permitted to provide feedback pertaining to a transaction upon conclusion of that transaction. The feedback information may pertain to a further user that participated in the transaction, or to the object (e.g., goods or services) that was the subject of the transaction. In an alternative embodiment, for example, comments or opinions are provided regarding an item or service that is offered for sale or regarding an event. In these cases it will be appreciated that a transaction is necessarily required for feedback to be permitted.

The feedback details table 53 includes an item number column 84 including an item identifier that points to a record within the item tables 42. A comment column 86 stores, for each entry, the actual text of the feedback, comment, or opinion. A type column 88, in one embodiment, stores indication as to whether the comment is positive, negative or neutral. A date column 90 stores, for each entry, the date on which the feedback, comment or opinion was delivered. A response column 92 stores the text of a response submitted by a user (e.g., a user to which the original comment pertained) in response to the comment text stored in column 86. Similarly, a rebuttal column 94 stores the text of a rebuttal to such a response.

A commentator column 96 stores the user identifier of the user that submitted the original comment, stored in column 86, for the entry. A commentee column 98 stores the user identifier of the user to which comment may have been directed.

It will be appreciated that further dates and other descriptive information may also populate the feedback details table 53.

Multiple Feedback Items

In order to facilitate the convenient provision of feedback by users of the auction facility 10 pertaining to a transaction (e.g., an auction transaction) in which a user participated, the present application proposes a method and system whereby a user may conveniently provide feedback pertaining to multiple transactions. By facilitating the harvesting of multiple feedbacks for a multiple transaction via a unified mechanism, the application addresses the inconvenience of tracking down multiple auctions via other indirect channels or mechanisms that may be provided by web site. In one embodiment, the present application facilitates the provision of multiple feedbacks pertaining to respective multiple transactions via a single interface (e.g., a markup language page interface). While the present application is discussed within the context of providing feeding regarding transactions within a user is participated, it will readily be appreciated that the present application may be extended to providing multiple feedbacks, comments or opinions pertaining to respective multiple products, events or other entities. For example, a book reviewer, utilizing the teachings of the present application, may conveniently provide comments, reviews or opinions pertaining to multiple books.

Figure 6:
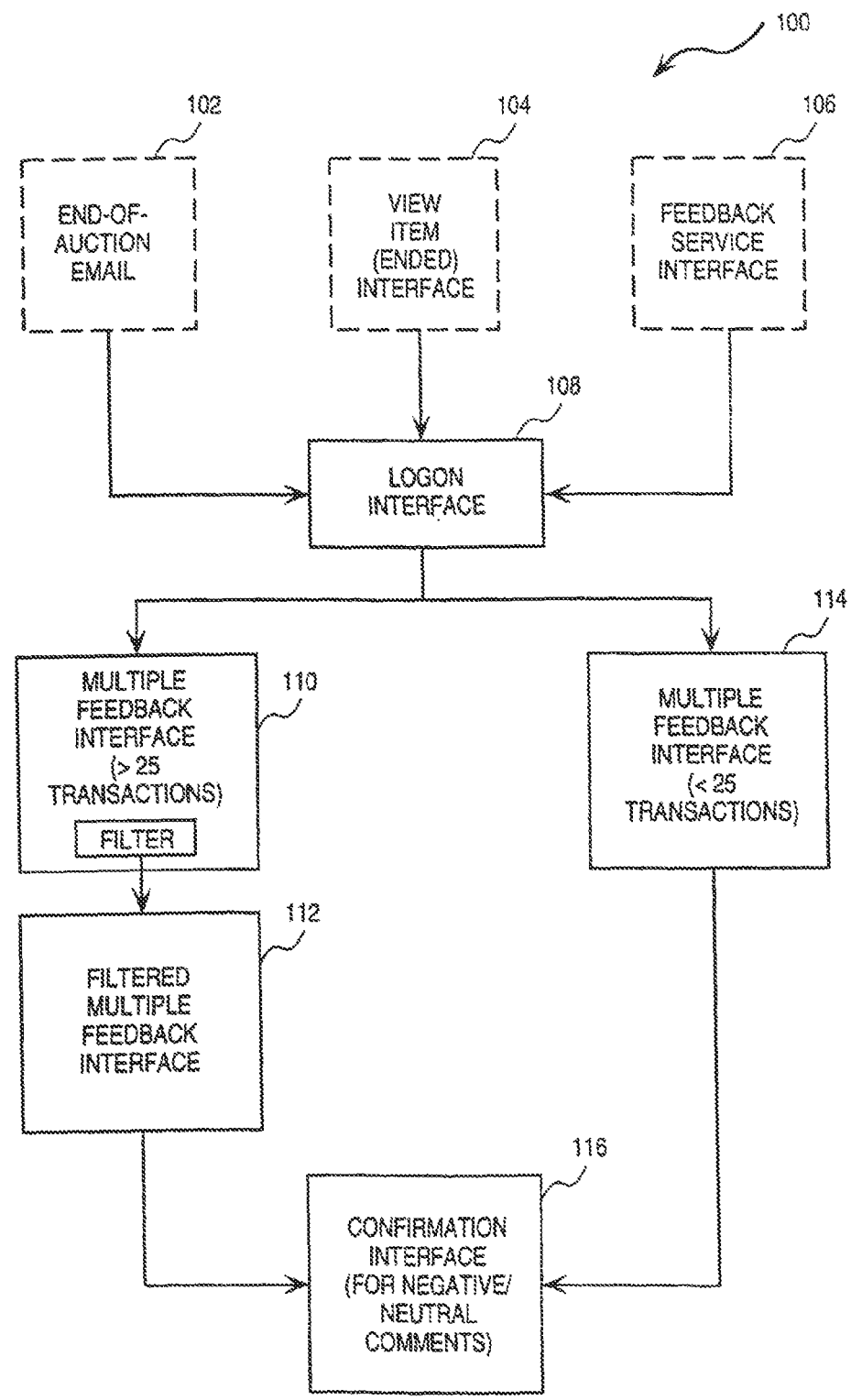
FIG. 6 illustrates an exemplary interface sequence, according to one embodiment, that may be implemented by the transaction facility for the purposes of harvesting feedback, comments, opinions or reviews.

FIG. 6 shows an interface sequence 100, according to an exemplary embodiment of the present application, that may be implemented by the auction facility 10 for the purposes of harvesting feedback (or comments, opinions or reviews) from users of the auction facility 10. The auction facility 10 may, in one embodiment, only permit a user to provide feedback pertaining to a transaction within which that user wants a participant and which has been established or completed. For example, a transaction may be established through the identification of the winner of an auction, which creates the implicit understanding that the established transaction, between the purchaser (i.e., the winning bidder) and the seller, will be completed by performance of the reciprocal obligations underlying the transaction.

The sequence 100 of interfaces shown in FIG. 6 will be described with reference to the flow chart shown in FIGS. 7A and 7B. Exemplary representations of the various interfaces included with the sequence 100 are shown in FIGS. 8-12.

On the ending of an auction, and the identification of winning bidder, the auction facility 10, via the e-mail servers 21, issues an end-of-auction e-mail 102 to both the winning bidder and the seller advising both parties of the outcome of the auction, and providing respective contact details to allow the parties to contact each other.

The interface sequence 100 commences with a logon interface 108 through which a user of the facility 10 provides at least a user identifier and associated password. The logon interface 108 may be accessed, in one embodiment, via three mechanisms, namely an end-of-auction e-mail 102, a view item (auction ended) interface 104 or a feedback services interface 106, each of which comprises a markup language document (e.g., HTML document) including a hypertext link to an object (which will be described in further details below) that generates the logon interface 108 as well as further interfaces of the sequence 100. The end-of-auction e-mail 102, as noted above, is communicated by the e-mail servers 21 of the auction facility 10 to both a winning bidder and a seller upon the end of the auction process, the e-mail 102 notifying respective parties about the end of the auction and also providing contact details. The view item (auction ended) interface 104 is presented to a user, at conclusion of an auction, when seeking further information regarding the item that was the subject of the auction. For example, upon conclusion of an auction, a textual description of the subject of the auction may be hypertext linked to generate the interface 104. The feedback services interface 106 may be accessed, for example, through a site navigation menu or toolbar that presents the option to a. user of leaving feedback. The feedback services interface 106 is typically used to leave feedback where a user does not know the item number identifying an item or where a user wishes to view feedback concerning multiple auctions within which t user has been a participant within a predetermined period of time (e.g., the past 60 days).

Figure 14:
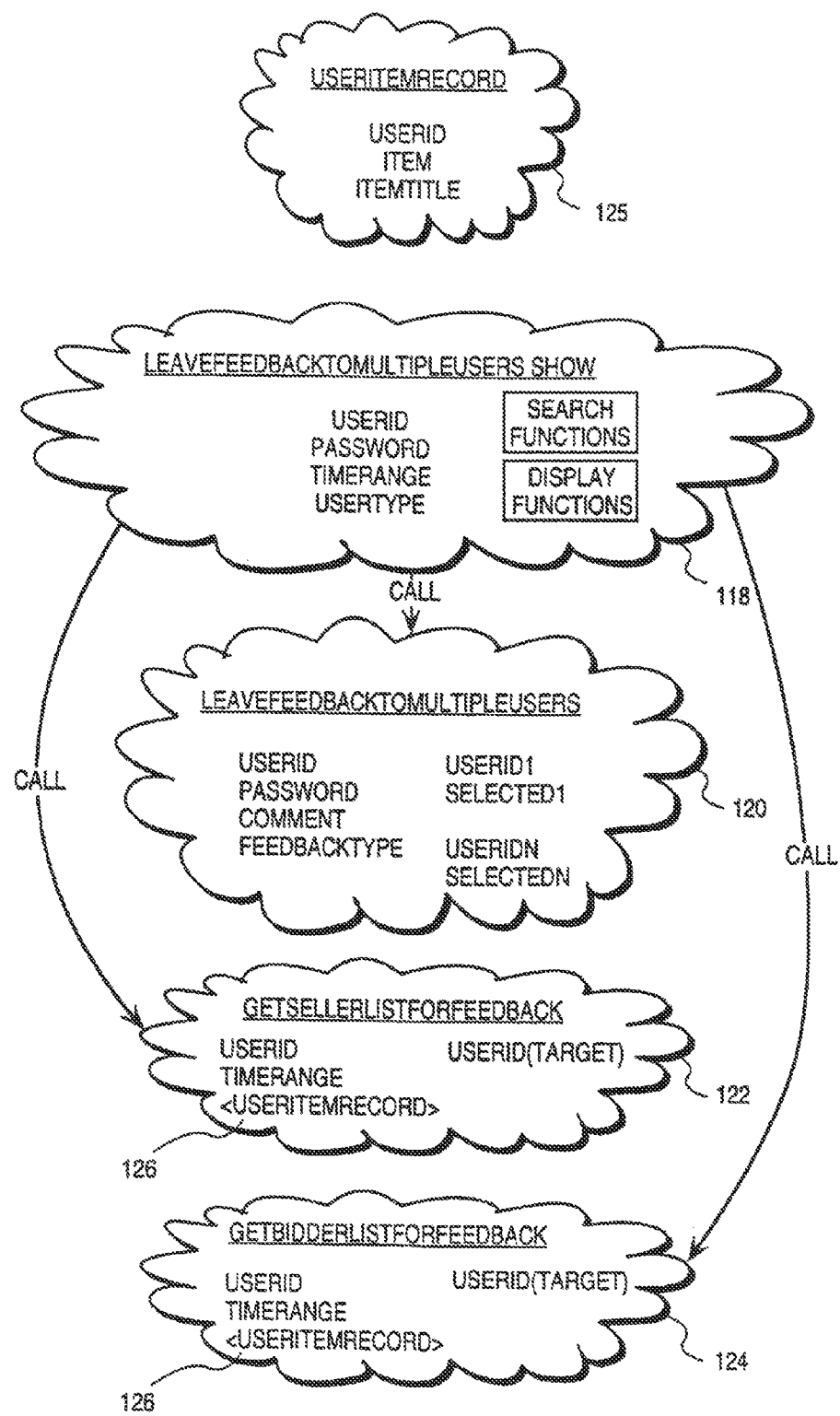
FIG. 14 is an object diagram illustrating exemplary objects of the transaction facility that may be utilized to harvest multiple feedbacks, opinions or comments from users of a transaction facility.

The interface 108, and subsequent interfaces 110-116, are generated by a collection of objects (or methods), exemplary embodiments of which are illustrated in FIG. 14. Specifically, a logon interface 108 is generated by a "LeaveFeedbackToMultipleUsersShow" object 118. The object 118 is also responsible for generating a "threshold exceeded" multiple feedback interface 110, a filtered multiple feedback interface 112, a "does not exceed threshold" feedback interface 114 and a confirmation interface 116, as will be described in further detail below. To this end, the object 118 issues calls to a "LeaveFeedbackToMultipleUsers" object 120 that is responsible for actually recording feedback inputted via the interfaces 108-116 to the database 23, and specifically the feedback and feedback details tables 52 and 53. The object 118 also issues calls to a "GetSellerListForFeedback" object 122 that retrieves a list of sellers and items from the transaction record table 60, for a clearing user identified by a specific user identifier. The object 122 includes a "UserItemRecord" vector 126 (e.g., "useritemrecord" 125) that is used as a container for the retrieved user and item information, the contents of the vector 126 being released to the object 118.

The object 118 similarly issues a call to a "GetBidderListForFeedback" object 124 that retrieves a list of bidders and items from the transaction record table 60 of the database 23 where the bidders have both items from a specific user identified by an inputted user identifier. The object 124 similarly uses the "UserItemRecord" vector to pass bidder and item information to the object 118.

The interfaces 108-116 will now be described within the context of a method 128, according to one embodiment of the present application, of harvesting feedbacks, comments or opinions regarding multiple items from users of a network based transaction facility. The method 128 is illustrated by the flow chart indicated in FIGS. 7A and 7B.

Figure 8:
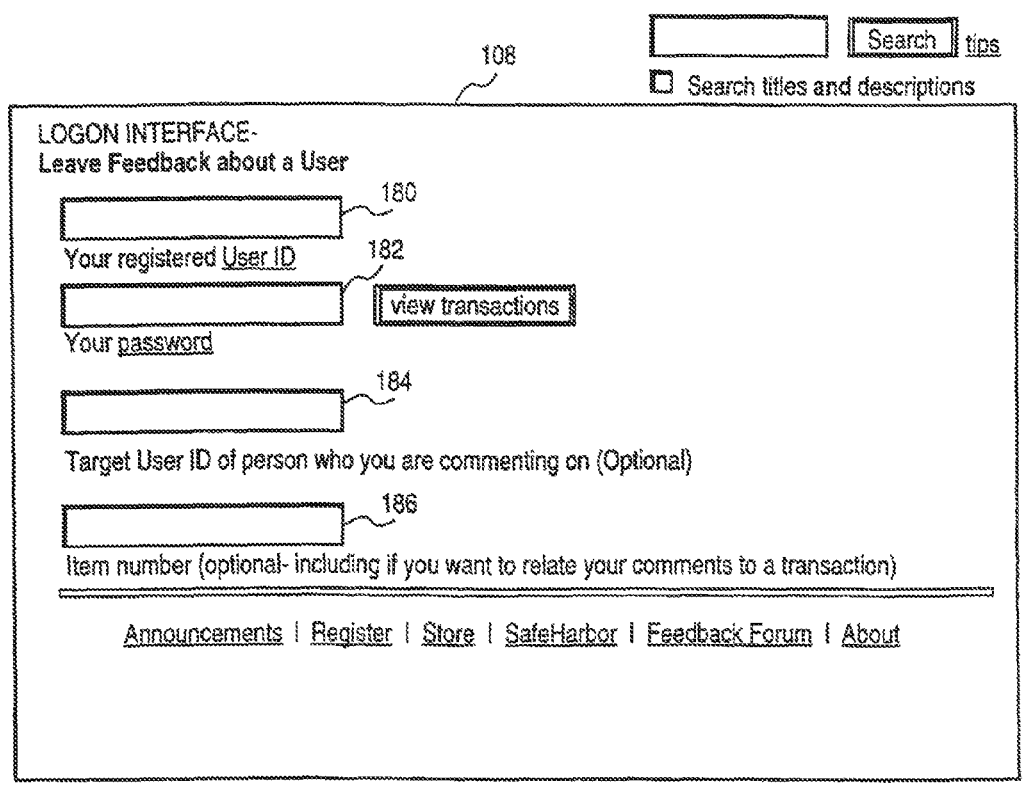
FIG. 8 illustrates an exemplary logon interface for accessing a feedback mechanism of the transaction facility.
Figure 9:
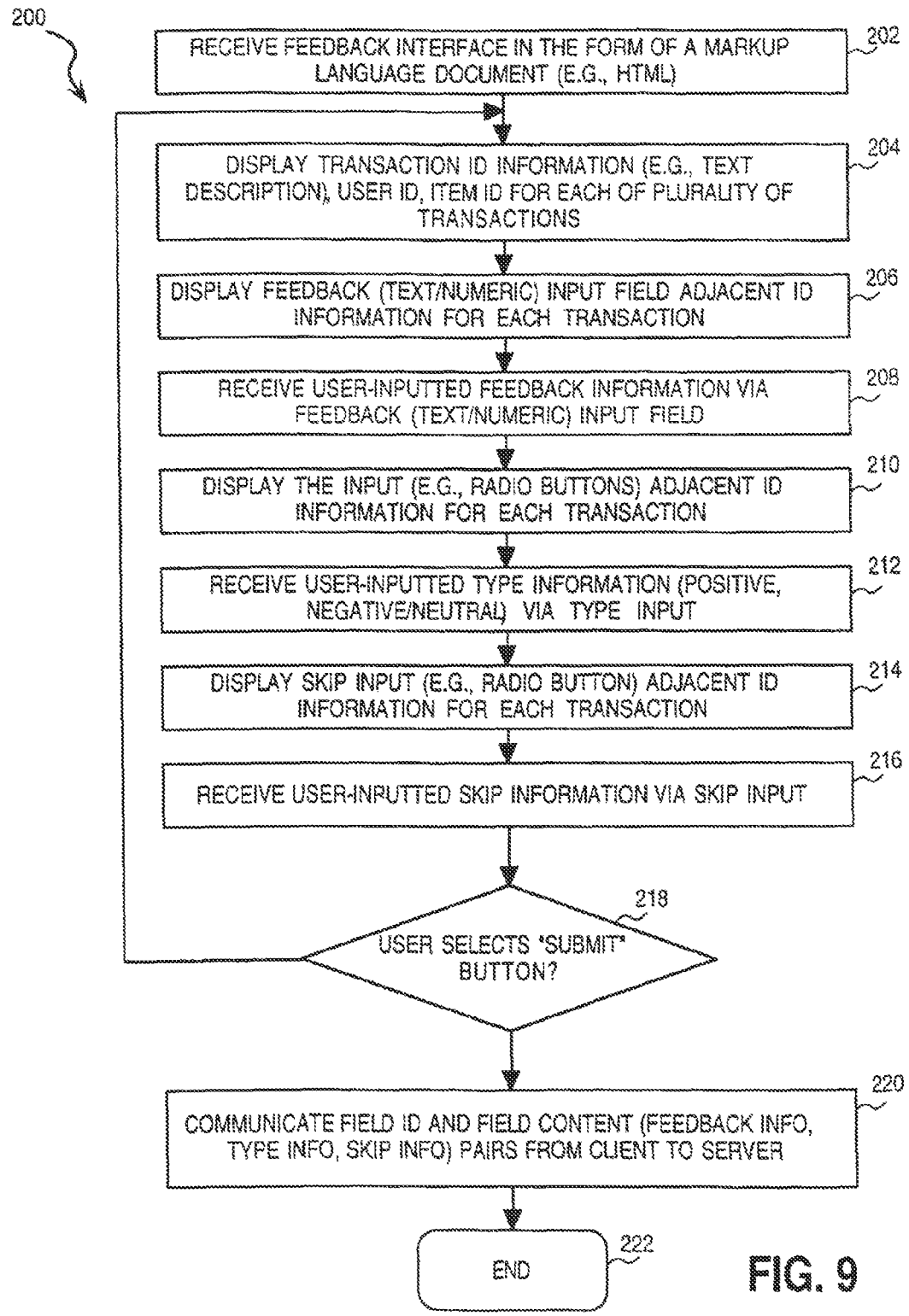
FIG. 9 is a flow chart illustrating an exemplary method of displaying a user interface to harvest feedback, comments and opinions pertaining to multiple items.

The method 128 commences with a logon confirmation operation at block 130 performed utilizing a user identifier and a password. Specifically, the logon interface 108, an exemplary embodiment of which is illustrated in FIG. 8, provides a user identifier field 180 and password field 182 into which a user may enter a user identifier and password to enable the logon confirmation operation at block 130. The logon interface 108 illustrated in FIG. 8 also includes a further target user identifier field 184, into which a commentator user (identified by the user ID entered into fields 180) can specify the user identifier of a further user to which the feedback, or comments, are applicable. An item number field 186 also allows a commentator user 186 to specify a specific item number (e.g., identifying an auction) if the feedback that the commentator user wishes to leave is to be directed towards a specific item. Input into the fields 184 and 186 is optional, and may function as filter criteria so that only a limited number of information items are presented in a subsequent multiple feedback interface.

Returning to FIG. 7A, at block 132, the object 118 issues calls to the "GetSellerListForFeedback" object 122 and the "GetBidderListForFeedback" object 124 to retrieve a list comprising multiple completed transactions for which the commentator user was either a successful bidder or seller.

The objects 122 and 124 retrieve the relevant transaction information from the transaction record table 60 of the database 23, and only retrieve transaction records for which no feedback has been left and which were established within a predetermined time period (e.g., the past 60 days). To this end, the objects 122 and 124 may identify records within the transaction record table 60 for which the feedback column 73 indicates that no feedback has been left, and transaction records for which date information included within the end date column 64 identifies the transaction has been established within the predetermined time period.

In one embodiment, the predetermined time period may be a default value that is automatically specified. In an alternative embodiment, a "time frame" input field may be provided within the logon interface 108, utilizing which a commentator user may specify the predetermined time period.

At decision box 134, the object 118 makes a determination as to whether more than a predetermined number (e.g., 25) transaction records are retrieved from the transaction record table 60 at block 132. Following a positive determination at decision box 134, at block 136, the object 118 retrieves a first template (e.g., an ISAPI page) that provides for pagination and includes a filter field, as will be described in further detail below. Following a negative determination at decision box 134, the object 118 retrieves a second template (e.g., an ISAPI page) that, while facilitating pagination, does not provide a filter field.

At block 138, the template retrieved at block 136 or 140 is populated by ISAPI code, utilizing the contents of the "UserItemRecord" vectors 126 returned by the objects 122 and/or 124 to generate a feedback interface (e.g., the multiple feedback interface 110 or 114).

At block 142, the feedback interface generated at block 138 (e.g., HTML code) is communicated, via the Internet 34, to the client program 30 (e.g., a browser) for display.

At decision box 144, a determination is made as to whether a filter criterion has been applied to the transaction records by a commentator user. If so, at block 146, the object 118 may issue fresh calls to the objects 122 and 124 to retrieve a modified list of transaction and user information. In an alternative embodiment, the object 118 may simply discard objects (or vectors) previously returned by the objects 122 and 124 that do not meet the filter criteria.

At block 148, feedback information, comments or opinions are received at the auction facility 10 from the client program 30 and specifically from the relevant interface communicated at block 142. The feedback information may, in one embodiment, include a number of feedback items, each feedback item including date information specifying a date on which the feedback was provided, comment information providing the actual textual content of the feedback, type information indicating whether the feedback is positive, negative or neutral, user identifier information identifying both the commentator and the target (or commentee) users and any other pertinent information. In exemplary embodiments, which are further described below, the feedback interfaces may comprise markup language documents (e.g., HTML pages) that include radio buttons or check boxes that may be utilized to identify whether a feedback item is provided with respect to an underlying information item (e.g., an auction) and that may also be utilized to identify the type of feedback being provided (e.g., positive, negative or neutral).

At block 150, the object 118 makes a call to the "LeaveFeedbackToMultipleUsers" object 120 to create multiple instances of the object 120, each object containing the details of each of the feedback items received at block 148. Accordingly, instances of the object 120 may be viewed as containers for each of the feedback items.

Figure 7A:
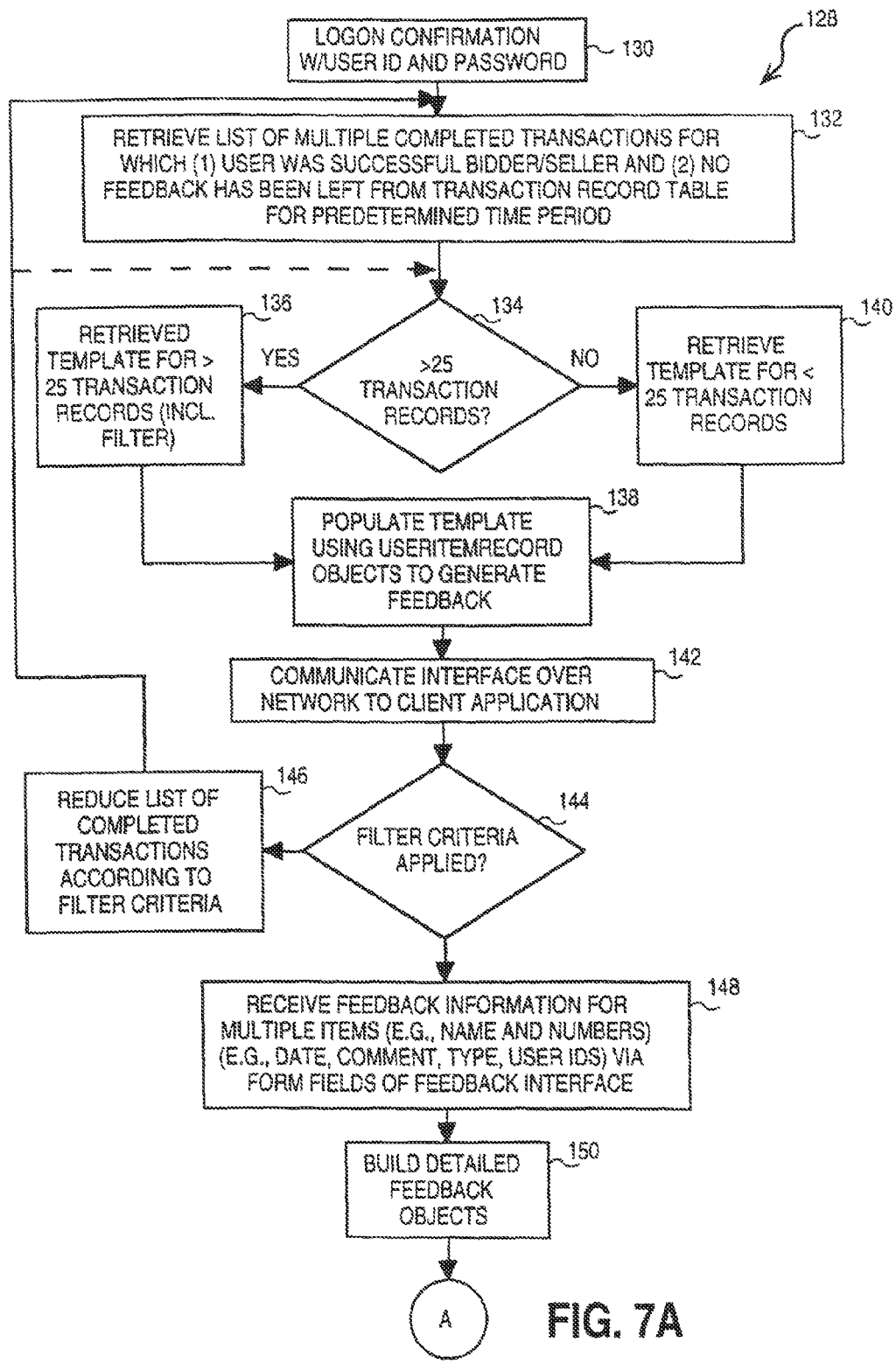
FIGS. 7A-7B are flow charts illustrating an exemplary method of harvesting feedback, comments or reviews pertaining to transactions facilitated by a network-based transaction facility.
Figure 7B:
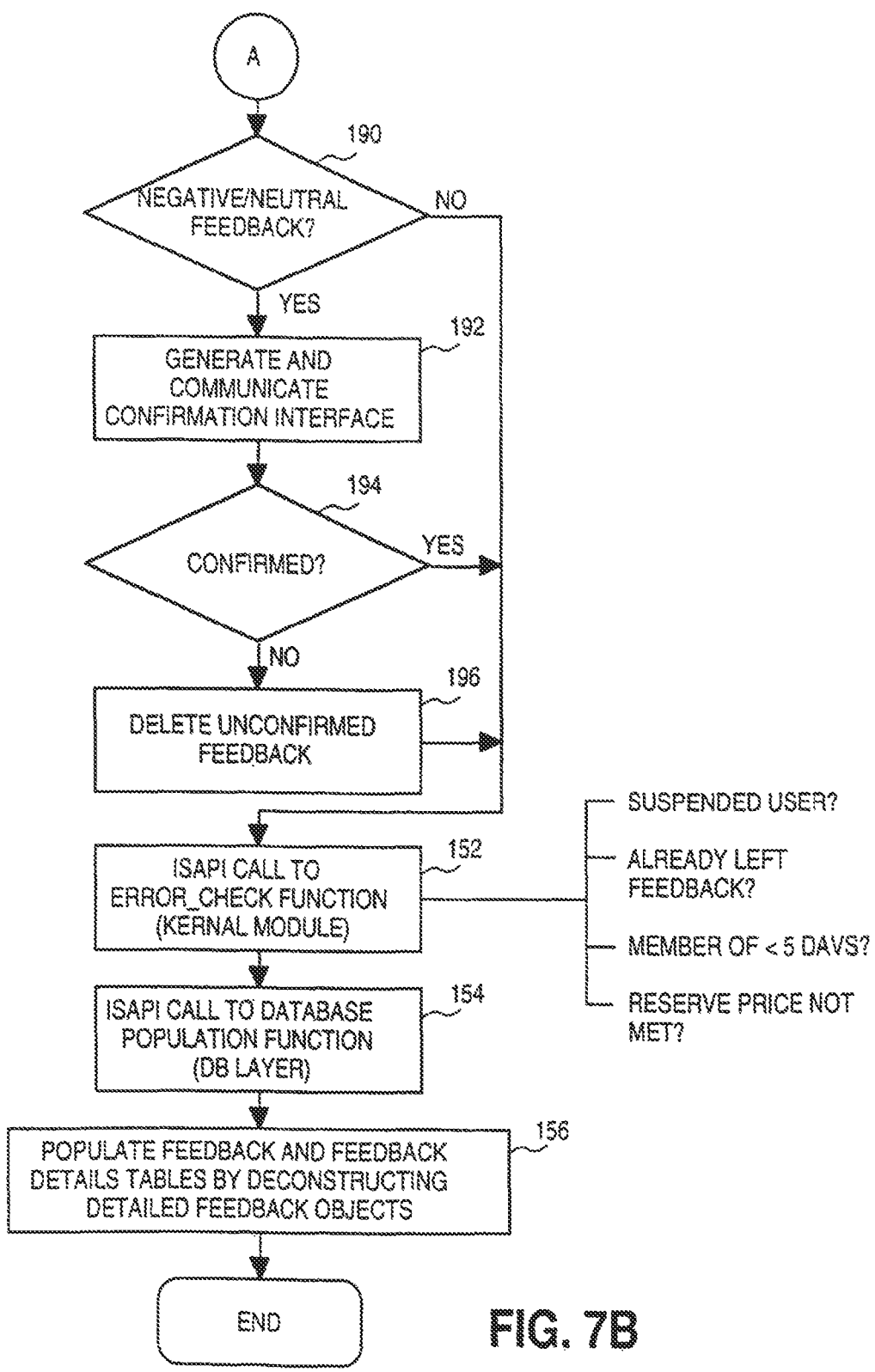

Proceeding to FIG. 7B, at decision box 190, a determination is made as to whether any of the feedback has been categorized via the commentator user as being of a negative or neutral type. If so, at block 192, the object 118 generates the confirmation interface 116 (e.g., in the form of an HTML document) that is communicated from the auction facility 10 to the client program 30. The confirmation interface 116 prompts the commentator user for confirmation regarding any negative or neutral comments. At decision box 194, a determination is made as to whether all negative or neutral feedback comments have been confirmed. If not, the unconfirmed feedback is deleted at block 196. Following a positive determination at decision box 194, or following a negative determination at decision box 190, or following completion of block 196, the method proceeds to block 152, where the object 118 issues an ISAPI call to an error_check function (not illustrated) that comprises a kernel module, and that performs a number of checks with respect to each feedback item, embodied within an instance of the object 120. For example, the error_check function may determine whether the commentator, or target, user has been suspended from the auction facility 10, whether feedback has already been submitted for the respective transaction, whether the commentator user has been a member of the auction facility 10 for less than predetermined time (e.g., five days) or whether a reserve price has been met for the relevant item for transaction) to which the feedback comment pertains. If any of the conditions embodied within the error_check function are not met, the relevant feedback comment is deleted, for example by deleting the instance of the object 120 embodying the feedback comment.

At block 154, ISAPI calls are issued from each of the objects 120 to populate the database 23, and more specifically the feedback table 52 and the feedback details table 53, with the information contained in the instances of the objects 120, which operation is then actually performed at block 156. Following block 156, the method 128 then ends.

Having now described server-side operations with respect to FIGS. 7A and 7B, a description is now provided of an exemplary method 200 of displaying a user interface to harvest feedback, comments or opinions pertaining to multiple items (e.g., transactions). The method 200 shall be described within the context of the interfaces 110, 112 and 114 illustrated in FIG. 6 and with reference to a flowchart illustrated in FIG. 9.

As stated above with respect to FIG. 7A, at block 142, a server may communicate a feedback interface over the communications network to a client program 30 (e.g., a browser) for display. Accordingly, the method 200 commences at block 202 with the receipt of a feedback interface in the form of a markup language document. The feedback interface may be, depending on the number of transactions, the "exceeds thresholds" multiple feedback interface 110 or the "does not exceed threshold" multiple feedback interface 114. The feedback interface, in one embodiment, comprises a markup language document (e.g., an HTML document).

At block 204, the client program 30 then proceeds to display transaction identifier information for a plurality of transactions within a single interface. FIG. 10 provides an exemplary embodiment of the "exceeds threshold" multiple feedback interface 110, and the transaction identifier information is shown to include user identifier information 230, identifying the other party (e.g., the winning bidder or the seller) involved in the transaction, an item identifier providing an item number (or code) identifying the subject matter of the transaction 232, an item description 234 providing an alpha-numeric description of the subject of the transaction, ended date information 236, indicating the date on which the transaction was established through the ending of the auction process.

At block 206, a feedback input field 238 is displayed to indicate an association between the input field and the transaction identifier information. For example, referring again to the exemplary feedback interface 110 shown in FIG. 10, a feedback input field 238 is displayed on the interface 110 adjacent the transaction identifier information. The feedback input field 238 can receive both textual and numeric input. In an alternative embodiment, a drop-down menu may be provided to input one of a selected set of comments into the feedback input field 238.

At block 208, the interface then receives user-inputted feedback information (e.g., comments or opinions) via the feedback input field 238. This feedback may be provided by an alpha-numeric input device, such as a keyboard, or by voice recognition software. In an alternative embodiment of the application, the input field 238 may be replaced by a voice recording mechanism that allows the commentator user to leave voice feedback by initiating a recording process.

At block 210, the method 200 displays a type input mechanism adjacent the identifier information for each transaction, the type input mechanism allowing a commentator user to specify type information (e.g., positive, negative or neutral) feedback for the relevant transaction. Referring again to FIG. 10, an exemplary feedback type input 240 is shown to include three radio buttons, one of which is selectable to identify the input into the feedback input field 238 as being positive, negative or neutral. Accordingly, at block 212, the interface 110 receives user-inputted type information via the feedback type input 240.

At block 214, the method 200 displays a "skip" input 242, in the exemplary form of a radio button or check box, adjacent the identification information for each transaction displayed within the interface. FIG. 10 shows an exemplary skip input 242 comprising a radio button that is user-selectable to indicate that the commentator user does not wish to provide feedback regarding the relevant transaction. In an alternative embodiment, a check box may be provided to allow user indication that no feedback is being provided.

As is well known in the art, within HTML a check box or radio button is defined by TYPE, NAME and VALUE specifiers, where the TYPE specifier specifies either a check box or a radio button, the NAME specifier specifies a variable where a return value will be stored and the VALUE specifier stores what will be returned in the variable if the check box is checked, or the radio button is selected. Accordingly, feedback type and skip indications may be communicated from the interface 110 in pairs to an ISAPI function implemented by the objects as described above. Each information pair may comprise, for example, a name and a value.

At block 216, the interface 110 receives the user inputted skip information (or identification) via the skip input 242.

At decision box 218, a determination is made as to whether the user selects a "submit" button to communicate the information inputted via the interface 110 to the server side. If not, the method 200 loops through blocks 204-216. Alternatively, if the user does select the "submit" button at decision box 218, at block 220, field identifier and field content information (e.g., feedback, type information and skip information) is communicated in pairs from the client program 30 to the server side. The method 200 then ends at block 222.

User Interfaces

Further descriptions of exemplary user interfaces will now be described with reference to FIGS. 10-13. While the exemplary interfaces are described as comprising markup language documents displayed by a browser, it will be appreciated that the described interfaces could comprise user interfaces presented by any Windows® client application or stand-alone application, and need not necessarily comprise markup language documents.

FIG. 10, as described above, illustrates an exemplary "exceeds threshold" feedback interface 110 that provides a predetermined maximum number (e.g., 25) of discrete feedback windows 244, each window 244 being dedicated to a specific one of a number of transactions or items. Each feedback window 244 includes transaction for item) identification information, a feedback type input 240, a feedback skip input 242 and a feedback input field 238. Accordingly, a collection of feedback windows 244, all displayed in a single interface 110, allow a commentator to provide feedback pertaining to multiple transactions or items in a convenient manner without having to advance through a series of distinct interfaces.

The number of feedback windows 244 displayed in a single interface is limited (e.g., 25), and accordingly the interface 110 provides retreat and advance buttons 246 and 248 that allow a commentator user to retreat to a previous collection of feedback windows 244, or advance to a subsequent collection of feedback windows 244.

The "exceeds threshold" feedback interface 110 furthermore includes a filter criteria input field 250, into which a commentator user may input a user identifier, or item number, to limit the number of transactions, or items, pertaining to which feedback is to be submitted. For example, where the number of transactions fir which the commentator may leave feedback exceeds a predetermined threshold (e.g., 50), the filter allows a commentator user to reduce the number of transactions by specifying only transactions involving a particular user or pertaining to a specific item. in alternative embodiments, the filter criteria may comprise a keyword on which a search is done to locate any transactions for which the descriptions contain relevant keywords. The filter mechanism underlying the filter criteria input field 250 allows a commentator user conveniently to limit the number of feedbacks displayed within an interface, and also conveniently to identify specific transactions for which the commentator user wishes to leave feedback.

To this end, FIG. 11 illustrates an exemplary filtered multiple feedback interface 112 that may follow the "exceeds threshold" feedback interface 110 following filtering of the transactions presented in the interface 110.

FIG. 12 illustrates an exemplary "does not exceed threshold" feedback interface 114, which is substantially similar to the filtered multiple feedback interface 112, but does not include the retreat and advance buttons 246 and 248. It will also be noted that the interface 114 does not provide a filter criteria input field 250.

FIG. 13 illustrates an exemplary embodiment of the confirmation interface 116, described above with reference to FIG. 6.

In summary, it will be appreciated that the above described interfaces, and underlying technologies, provide a convenient vehicle for the inputting of feedback, comments or opinions regarding multiple items, or transactions, via a single user interface.

Figure 15:
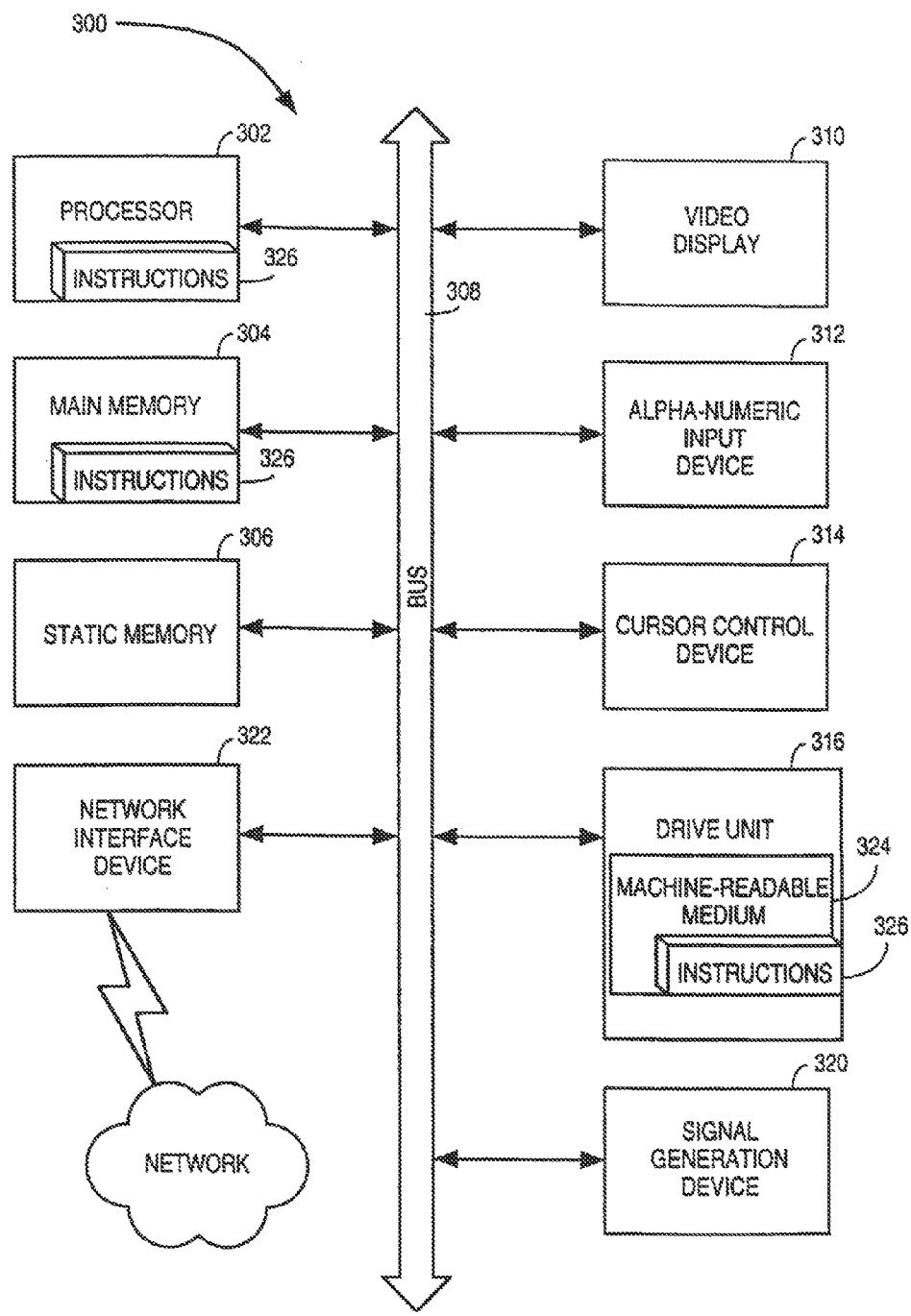
FIG. 15 is a diagrammatic representation of a machine, in an exemplary form of a computer system, in which a set of instructions for causing the machine to perform any of the methodologies of the present application may be executed.

FIG. 15 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g. a keyboard), a cursor control device 314 (e.g. a mouse), a disk drive unit 316, a signal generation device 320 (e.g. a speaker) and a network interface device 322

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "machine-readable medium" shall be taken to include any medium that is capable of storing or encoding a sequence of instructions for execution by the machine and that cause the machine to perform any one of the methodologies of the present application. The term "machine-readable medium" shall accordingly be taken to included, but not be limited to, solid-state memories, and optical and magnetic disks.

Thus, methods and systems for harvesting comments regarding users on a network-based facility have been described. Although the present application has been described with reference to specific exemplary embodiments, it will be evident that various modifications and changes may be made to these embodiments without departing from the broader spirit and scope of the application. Accordingly, the specification and drawings are to be regarded in an illustrative rather than a restrictive sense.

What is claimed is:

1. A method including: transmitting, from a server over a network to a client machine, instructions to cause display of a single input interface on the client machine, the single input interface including a plurality of input mechanisms, the plurality of input mechanisms including a first input mechanism facilitating user input of first feedback information pertaining to a first user and a second input mechanism facilitating user input of second feedback information pertaining to a second user, each of the plurality of input mechanisms comprising a feedback input field and a skip indicator that is user-selectable to indicate that no feedback is provided, wherein the plurality of input mechanisms are respectively associated with a plurality of items, and wherein the plurality of items includes items offered for sale on the network-based facility and each of the plurality of items is respectively associated with one of a plurality of completed transactions on the network-based facility;

receiving feedback information, at the server over the network, the feedback information provided through the single input interface, the feedback information pertaining to the first user and the second user; and storing, by the server in a feedback table of a networked database, the received feedback information.

2. The method of claim 1 wherein the single input interface includes a filter input field via which a filter criteria is received, and wherein the plurality of input mechanisms are associated with the plurality of items, and further including identifying the plurality of items by applying the filtering criteria to a database of data items.

3. The method of claim 2, wherein the filter criteria includes a plurality of item numbers, and the identifying the plurality of items is based on the plurality of item numbers.

4. The method of claim 2, wherein the filter criteria includes a user number that is associated with a third user, and the identifying the plurality of items is based on the user number.

5. The method of claim 2, wherein the identifying the plurality of items includes identifying that the plurality of items are offered for sale on the network-based facility.

6. The method of claim 2, wherein the identifying the plurality of item includes identifying the plurality of completed transactions on the network-based facility.

7. The method of claim 6, wherein the identifying the plurality of completed transactions includes identifying a first transaction in which the first user participated as a buyer and the second user participated as a seller.

8. The method of claim 6, further including receiving a keyword used to identify the plurality of completed transactions respectively including a description that contains keywords.

9. The method of claim 6, wherein the single input interface includes a skip indicator that is user-selectable to indicate that no comment information is provided for a first completed transaction.

10. The method of clam 6, wherein the single input interface includes a first user-selectable option to advance to a second input interface, and a second user-selectable option to retreat to the single input interface.

11. A system including: at least one processor, and memory that includes instructions that, when executed by the at least one processor, causes a network-based facility to:

transmit, from a server over a network to a client machine, instructions to cause display of a single input interface on the client machine, the single input interface including a plurality of input mechanisms, the plurality of input mechanisms including a first input mechanism facilitating user input of first feedback information pertaining to a first user and a second input mechanism facilitating user input of second feedback information pertaining to a second user, each of the plurality of input mechanisms comprising a feedback input field and a skip indicator that is user-selectable to indicate that no feedback is provided, wherein the plurality of input mechanisms are respectively associated with a plurality of items, and wherein the plurality of items includes items offered for sale on the network-based facility and each of the plurality of items is respectively associated with one of a plurality of completed transactions on the network-based facility;

receive, feedback information at the server over the network, the feedback information including the first feedback information and the second feedback information and being, provided through the single input interface; and store, by the server in a feedback table of a networked database, the received feedback information.

12. The system of claim 11, wherein the at least one processor causes the system to communicate user interface information that includes a filter input field via which a filter criteria is received.

13. The system of claim 12, wherein the filter criteria includes a plurality of item numbers associated with the plurality of items.

14. The system of claim 11, wherein the plurality of completed transactions includes a first transaction in which the first user participated as a buyer and the second user participated as a seller.

15. The system of clam 11, wherein the single input interface includes a first user-selectable option for advancing to a second input interface, and wherein the second single input interface includes a second user-selectable option for retreating to the single input interface.

16. A non-transitory machine-readable medium having embodied thereon instructions executable by one or more processors of a machine that cause the machine to perform operations comprising:

transmitting, from a server over a network to a client machine, instructions to cause display of a single input interface on the client machine, the single input interface including a plurality of input mechanisms, the plurality of input mechanisms including a first input mechanism facilitating user input of first feedback information pertaining to a first user and a second input mechanism facilitating user input of second feedback information pertaining to a second user, each of the plurality of input mechanisms comprising a feedback input field and a skip indicator that is user-selectable to indicate that no feedback is provided, wherein the plurality of input mechanisms are respectively associated with a plurality of items, and wherein the plurality of items includes items offered for sale on the network-based facility and each of the plurality of items is respectively associated with one of a plurality of completed transactions on the network-based facility;

receiving, feedback information at the server over the network, the feedback information including the first feedback information and the second feedback information and being provided through the single input interface; and storing, by the server in a feedback table of a networked database, the received feedback information.

* * * * *